US012751369B2

(12) United States Patent
Wisdom et al.

(10) Patent No.: US 12,751,369 B2
(45) Date of Patent: Oct. 6, 2026

(54) END EFFECTOR FOR HARVESTING PLANTS

(71) Applicant: Automated Harvesting Solutions, LLC, Burlington, WA (US)

(72) Inventors: Anthony Wisdom, Burlington, WA (US); Ian Mintz, Burlington, WA (US)

(73) Assignee: Automated Harvesting Solutions, LLC, Burlington, WA (US)

(*) Notice: Subject to any disclaimer, the term of this patent is extended or adjusted under 35 U.S.C. 154(b) by 728 days.

(21) Appl. No.: 17/980,447

(22) Filed: Nov. 3, 2022

(65) Prior Publication Data

US 2024/0147903 A1 May 9, 2024

(51) Int. Cl.
*A01D 46/30* (2006.01)
*A01D 45/26* (2006.01)

(52) U.S. Cl.
CPC ............. *A01D 46/30* (2013.01); *A01D 45/26* (2013.01)

(58) Field of Classification Search
CPC ....... A01D 46/30; A01D 45/26; A01D 45/002
See application file for complete search history.

(56) References Cited

U.S. PATENT DOCUMENTS 11,470,781 B2 10/2022 Estwick
11,576,305 B2 2/2023 Estwick
2007/0095041 A1* 5/2007 de Groot .............. A23N 15/003 56/13.5
2016/0157430 A1* 6/2016 Pitzer ..................... A01D 46/24 56/331
2018/0035611 A1* 2/2018 D'Arrigo ............. A01D 45/263
2019/0053430 A1* 2/2019 Molenaar ............... A01D 45/26
2019/0297778 A1* 10/2019 George .................. A01D 45/26
2020/0390036 A1* 12/2020 George ................ A01B 79/005
2023/0354747 A1* 11/2023 Chavasse ............... A01D 46/30
2024/0081186 A1* 3/2024 Derycke ................ B25J 9/1679

FOREIGN PATENT DOCUMENTS

CN 113785692 A * 12/2021
CN 114872007 A * 8/2022
CN 113785692 B 11/2022
CN 114902866 B 10/2023
WO 2016133918 A1 8/2016

OTHER PUBLICATIONS

CN_113785692_A_—_English_translation (Year: 2021).*
CN_114872007_A—English translation (Year: 2022).*
The PCT Search Report and Written Opinion mailed Jan. 22, 2024 for PCT Application No. PCT/US2023/034448 from PCT Summary, 10 pages.
International Preliminary Report on Patentability for International Application No. PCT/US23/34448, mailed May 15, 1 2025, 8 pages.

* cited by examiner

*Primary Examiner* — Christopher J Sebesta
*Assistant Examiner* — Julia C Tran
(74) *Attorney, Agent, or Firm* — Lee & Hayes, P.C.

(57) ABSTRACT

An end effector includes a housing, a first door pivotably coupled to the housing, and a second door pivotably coupled to the housing. An actuator operably couples to the first door and the second door, and is configured to transition the first door and the second door between (i) a closed state in which access to an interior of the housing is restricted and (ii) an opened state in which access to the interior of the housing is permitted. A cutting mechanism is configured to sever an edible portion of a plant from a remaining portion of the plant.

20 Claims, 26 Drawing Sheets

END EFFECTOR FOR HARVESTING PLANTS

BACKGROUND

Crops, or other plants, are conventionally harvested by hand. Cauliflower, broccoli, or other stemmed vegetables, for example, are usually harvested manually by a crew of workers. As part of this process, workers visually inspect each plant to determine whether the plant is ready for harvesting. Conventional techniques also involve multiple handling stages, which gives rise to bruising or damage. The process of examining, harvesting, and sorting individual plants is labor-intensive, inefficient, and wasteful.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. The systems and devices depicted in the accompanying figures are not to scale and components within the figures may be depicted not to scale with each other.

DETAILED DESCRIPTION

Figure 1:
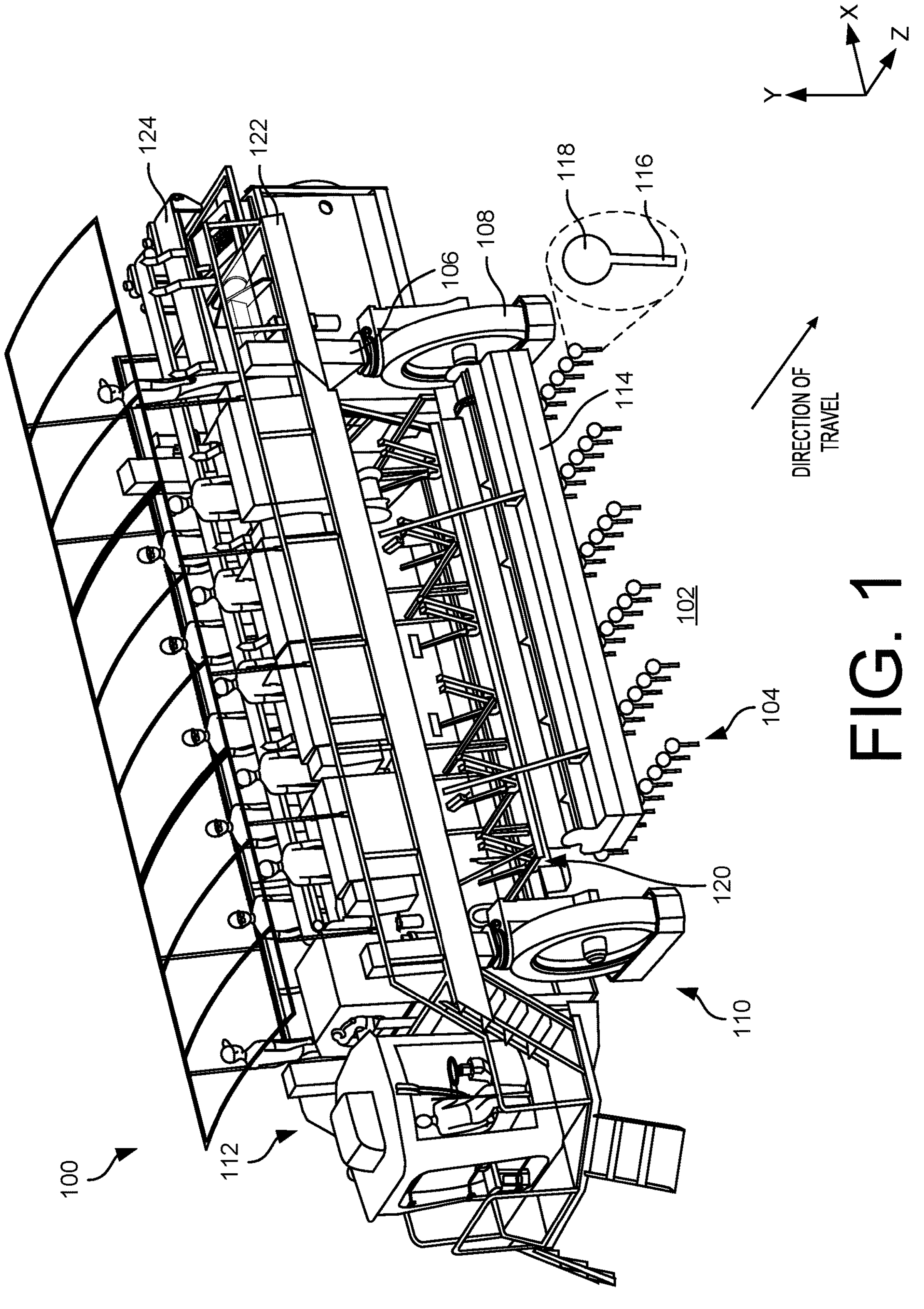
FIG. 1 illustrates a perspective view of an example machine configured to harvest plants, according to examples of the present disclosure.

This application is directed, at least in part, to an end effector configured to harvest edible portions of plants, such as broccoli, lettuce, cauliflower, and so forth. In some instances, the end effector includes a housing, doors operably coupled to the housing, and a cutting mechanism that severs the edible portion of the plant from a remaining portion of the plant (e.g., stalk, root, stem, etc.). The cutting mechanism is operable between a retracted position, and an extended position in which the edible portion of the plant is severed from the remaining portion of the plant. Additionally, the housing and the doors define a receptacle that receives the edible portion of the plant once harvested. The doors are configured to transition between a closed state and an opened state. In the closed state, the edible portion of the plant may be secured within the end effector, between the housing, the doors, and the cutting mechanism. In the opened state, the edible portion of the plant is removable from the end effector. For example, the doors may be opened to permit the edible portion to be removed from the end effector. In some instances, the end effector couples to a robotic arm, or other moveable type of gantry, that positions the end effector for harvesting the edible portion of the plant. As a machine or harvester traverses about an environment (e.g., field), the machine selectively and robotically harvests the edible portions that are ready for harvesting. Here, the machine may include sensors, such as an imaging system, for detecting and analyzing characteristic(s) of edible portions of the plant for use in controlling the end effectors to harvest the edible portions. The end effectors described herein may provide improved efficiencies for harvesting edible portions of the plants while reducing waste and increasing yields.

The end effector, or more generally the machine, is configured to harvest the edible portions depending on a maturity of the edible portions. For example, the end effector may be selectively controlled to harvest the edible portions based on whether the edible portions are ripe for picking (e.g., mature, full-grown, etc.). To assist in this process, the machine includes components for determining whether the edible portions are ready to be harvested. In some instances, the components may be distributed or mounted across the machine, the robotic arm, the end effector, and so forth. For example, the machine may include an imaging system for detecting harvestable edible portions within the field. The imaging system may image unharvested rows of plants within a field as the machine maneuvers within the field. The imaging system may be positioned vertically above the plants and arranged to image the edible portions. As the plants (or the edible portions) come within a field of view (FoV) of the imaging system, image(s) of the edible portions may be captured. In some instances, the imaging system may continuously image the plants such that a series of images of the edible portions are obtained. In some instances, the imaging system may include one or more cameras (e.g., red-green-blue (RGB) cameras) and/or one or more depth sensors (e.g., infrared (IR) sensors).

Introduced above, the machine is configured to harvest the edible portions based on characteristic(s) or properties of the plant (or the edible portions). For example, based on the imaging performed by the imaging system, the image(s) may be analyzed for determining characteristic(s) of the individual plants, or parts thereof (e.g., the edible portions, stem, leaves, etc.). By way of example, using the image(s) captured by the imaging system, processor(s) (a controller, system, etc.) may analyze the image(s) to determine a size, color, condition, quality, health, and/or ripeness of the edible portion. In some instances, these characteristics may be compared against reference characteristics to determine whether the edible portions are ready for harvesting. In some instances, based on the characteristic(s), a probability (or score) of the edible portion being ready for harvesting may be determined. If the probability satisfies a certain confidence threshold, the edible portion may be deemed or determined ready for harvesting. Additionally, or alternatively, in some instances, to determine the probability, machine-learning (ML) model(s) may be utilized. Additional details of determining whether an edible portion of a plant is ready for harvesting, and/or causing the edible portion of the plant to be harvested, are discussed in, for example, U.S. patent application Ser. No. 16/885,867, filed May 28, 2020, entitled "Harvester for Selectively and Robotically Harvesting Crops," the entirety of which is herein incorporated by reference in its entirety and for all purposes.

In some instances, the end effector is disposed on, or coupled to, a robotic arm, gantry, or other moveable type system. The robotic arm, for example, may position the end effector for harvesting the edible portions of the plants. By way of illustration, in response to determining that the edible portion of the plant is ready for harvesting, the robotic arm may position the end effector above the edible portion of the plant and descend the end effector upon the edible portion of the plant. In some instances, the imaging system may be utilized for positioning the end effector. For example, in addition to using the imaging system to detect harvestable edible portions, the image(s) may also be used to determine a central point of the plant (or of the edible portion). For example, the image(s) may be analyzed to determine a size of the edible portion (e.g., diameter, height, volume, etc.), and correspondingly the central point of the edible portion within coordinate space. This central point may be used, at least in part, for positioning the end effector.

With the edible portion of the plant inside the receptacle of the end effector, the cutting mechanism may be actuated to sever the edible portion of the plant from the remaining portion of the plant. After the edible portion of the plant is retained within the end effector, the robotic arm may move the end effector to a collection point, such as a basket, bin, or conveyor, for depositing the edible portion of the plant. In some instances, the robotic arm may be capable of moving translationally and/or rotationally. In some instances, the robotic arm may be movable in six degrees of freedom.

In some instances, the receptacle in which the edible portion is received is defined at least in part by the housing, the doors, and the cutting mechanism. In some instances, the housing and the doors define sides and/or a top of the receptacle. The cutting mechanism may define a bottom of the receptacle. However, being as the cutting mechanism transitions between the retracted position and the extended position, the receptacle may be open at the bottom depending on the position of the cutting mechanism and/or the operations being performed. For example, in the retracted position of the cutting mechanism, the receptacle may be open at the bottom such that the end effector may descend upon the edible portion of the plant. In the extended position of the cutting mechanism, the receptacle is enclosed at the bottom such that the edible portion of the plant is retained therein. In the retracted position, the cutting mechanism resides outside of the receptacle, and in the extended position, the cutting mechanism resides within the receptacle. Noted above, once the end effector descends upon the edible portion of the plant, the cutting mechanism may be actuated to sever the edible portion of the plant from the remaining portion of the plant. For example, once the edible portion resides within the receptacle, the cutting mechanism may be actuated. Therein, the cutting mechanism may remain in the extended position such that an end of the edible portion of the plant rests (e.g., sits) on the cutting mechanism. Keeping the cutting mechanism in the extended position prevents the edible portion falling out of the end effector. For example, in the extended position, the cutting mechanism may enclose the receptacle to prevent the edible portion of the plant falling out of the receptacle. In some instances, the cutting mechanism represents a blade, saw, knife, water jet, and so forth.

The end effector includes various actuators that actuate the doors and the cutting mechanism. For example, the end effector may include a first actuator that actuates the doors between the opened state and the closed state. The first actuator may close the doors after the edible portion of the plant has been removed from the end effector (e.g., following harvest), and may open the doors to remove the edible portion of the plant from the end effector. That is, the first actuator may close the doors to harvest the edible portion in order to define the receptacle in which the edible portion is retained. A second actuator may actuate the cutting mechanism to sever the edible portion of the plant from the remaining portion of the plant. For example, once the end effector descends upon the plant, the second actuator may actuate the cutting mechanism to sever the edible portion of the plant. The first actuator and the second actuator may represent pneumatic actuators, hydraulic actuators, gas cylinders, and so forth.

In some instances, the doors include a first door and a second door hingedly coupled to the housing. In some instances, the first door and the second door may be actuated simultaneously via the first actuator. For example, the first actuator may operably couple to both the first door and the second door, and actuation of the first actuator in a first direction (e.g., extension) may cause both the first door and the second door to open, while actuation of the first actuator in a second direction (e.g., retraction) may cause both the first door and the second door to close.

In some instances, following severing of the edible portion of the plant, the end effector may be moved to deposit the edible portion onto the conveyor. For example, with the edible portion of the plant retained within the end effector, the end effector may be moved to the conveyor. In some instances, the doors are transitioned to the opened state at the conveyor such that the edible portion of the plant may be deposited onto the conveyor. Additionally, or alternatively, the cutting mechanism may be moved to the retracted position such that the bottom of the receptacle is open for releasing the edible portion of the plant from the end effector. In some instances, as the end effector moves in a direction towards the conveyor, the doors may transition to the opened state. That is, the doors may be opened as the end effector is moving. As the doors are opened, the momentum of the robotic arm may cause the edible portion of the plant to be flung, tossed, or otherwise removed from the end effector. That is, given that the robotic arm may move the end effector towards the conveyor, as the robotic arm moves in a direction towards the conveyor, the doors may open and the edible portion of the plant may be ejected from the end effector. During this instance, the cutting mechanism may remain in the extended position such that the edible portion of the plant does not fall out of the receptacle (e.g., a bottom thereof). However, after the edible portion of the plant is removed from the end effector, the cutting mechanism may transition to the retracted position such that the end effector may descend upon another edible portion for harvesting. In some instances, the edible portion of the plant may be flung from the end effector as the end effector reserves direction (e.g., away from the conveyor).

In some instances, the end effector includes, or is coupled to, a positioning mechanism that translates the end effector in one or more directions. In some instances, the robotic arm may control movement of the end effector in one or more directions, and the positioning system may control movement of the end effector in one or more different directions. In some instances, the positioning system may control a more granular movement of the end effector as compared to the robotic arm. In some instances, the positioning system may be used to position the end effector on the edible portion of the plant after movement by the robotic arm. For example, the positioning system may be configured to translate the end effector using tracks, rails, motors, etc. In some instances, the positioning system may include an actuator (e.g., motor), a belt operably coupled to the actuator, and a carriage coupled to the belt. The carriage may be coupled to the end effector, or to the housing of the end effector. During actuator of the actuator, the belt may move, and the coupling of the carriage to belt correspondingly moves the end effector. Regardless, whether via the robotic arm and/or the positioning system, it is to be understood that the end effector may have multiple degrees of freedom to accommodate for the varying characteristic(s) of the plants. For example, as plants often do not grow in straight lines and are also not always vertical, the end effector may be moved to be centered or positioned relative to the edible portion being harvested.

In some instances, as the end effector descends upon the edible portion of the plant, the end effector may strip away stems, branches, leaves, or other foliage disposed around the edible portion of the plant. For example, some plants may include leaves that extend above, around, or beneath the edible portion. To selectively harvest the edible portion, as the end effector descends upon the edible portion, edges of the housing, for example, may strip away leaves. That is, as the end effector moves in a direction towards a ground surface, the leaves may be pushed downward towards the ground surface, thereby stripping the leaves away from the edible portion. Thereafter, the cutting mechanism may be actuated and the edible portion of the plant may be retained within the receptacle. Accordingly, the housing is sized to fit over (i.e., descend upon) the edible portion of the plant in order to contact the leaves and strip the leaves away from the edible portion.

In some instances, the end effector, or the robotic arms that maneuver the end effector, may be components of a machine, harvester, or piece of equipment that represents a self-propelled automated platform or platform that is towed, pulled, pushed, or carried by a tractor, for example. The platform may provide a space or area occupied by one or more operators, workers, and/or one or more foreman. The machine may generally include a body, or frame, having wheels or tracks which engage with the ground for traversing over landscapes or terrain (e.g., crops, fields, etc.). The frame may reside vertically above the plants such that the plants pass underneath the frame, between the wheels, as the machine moves about the field. In instances where the machine is self-propelled, the machine may include a driving mechanism (e.g., engines, motors, transmissions, gears, generators, etc.) that power the wheels for moving across the field. In some instances, the machine may include any number of robotic arms having end effectors for harvesting the edible portions across multiple rows of plants, or within the same row of plants. The machine may be configured to harvest multiple rows of plants at the same time, using the one or more robotic arms. In some instances, the machine may continuously move across the field and the robotic arms may continuously harvest the edible portions while the machine is in motion.

The present disclosure provides an overall understanding of the principles of the structure, function, device, and system disclosed herein. One or more examples of the present disclosure are illustrated in the accompanying drawings. Those of ordinary skill in the art will understand and appreciate that the devices, the systems, and/or the methods specifically described herein and illustrated in the accompanying drawings are non-limiting embodiments. The features illustrated or described in connection with one embodiment, or instance, may be combined with the features of other embodiments or instances. Such modifications and variations are intended to be included within the scope of the disclosure and appended claims.

FIG. 1 illustrates an example machine 100 for harvesting crops, according to examples of the present disclosure. The machine 100 may be configured to operate within a field 102 containing a plurality of broccoli plants 104 that are grown in rows. As the machine 100 traverses or moves across the field 102, the machine 100 functions to harvest the broccoli plants 104. As shown, and as discussed herein, the machine 100 includes components to harvest the machine 100 across multiple rows.

The machine 100 includes a frame 106 that supports components of the machine 100 or to which components of the machine 100 mount, couple, or are disposed. The frame 106 may, in some instances, comprise a body and provide a platform for supporting the components of the machine 100, as will be discussed herein. Wheels 108 may elevate the frame 106 above the field 102 and the broccoli plants 104, and move the machine 100 about the field 102. In some instances, the machine 100 may include a first side 110 and a second side 112, spaced apart from the first side 110 in the Z-direction. The first side 110 may include two of the wheels 108 that couple or mount to a first side of the frame 106 and the second side 112 may include two of the wheels 108 that couple or mount to a second side of the frame 106. The wheels 108 may operably couple to a driving mechanism of the machine 100, such as a motor or engine (e.g., combustion and/or electrical). Additionally, or alternatively, the machine 100 may be solar-powered, battery powered, and/or a combination thereof. The machine 100 may travel in more than one direction for harvesting the broccoli plants 104. For example, the wheels 108 may rotate clockwise to propel the machine 100 in a first direction of travel (e.g., as shown in FIG. 1), and subsequently, the wheels 108 may rotate counterclockwise to propel the harvester in a second, opposite direction.

The machine 100 may include an assembly or a hood 114 that extends from the frame 106. In some instances, the hood

114 includes components that function to image the broccoli plants 104 and if the broccoli plants 104 are ready for harvesting (e.g., ripe), components of the machine 100 may pick or harvest the individual broccoli plants 104. The hood 114 is shown extending from the frame 106, or being supported by the frame 106, and disposed above a ground surface within the field 102. As shown in FIG. 1, six rows of the broccoli plants 104 are configured to pass underneath the hood 114 at a given time. In such instances, the machine 100 may be configured to harvest six rows of the broccoli plants 104 simultaneously or at the same time. However, the machine 100 may be scaled to harvest more than or less than six rows of the broccoli plants 104 at a single time or instance.

Generally, the broccoli plants 104 include a stalk 116 growing upwards from the ground surface and buds that grow on an end thereof, above the ground surface. The buds form an edible crown 118 that is harvested for consumption. The edible crown 118 may correspond to a portion of the broccoli plants 104 that are harvested for consumption. In some instances, the edible crown 118 may be referred to as a head of the broccoli plant 104, a floret of the broccoli plant 104, a flower of the broccoli plant 104, or an edible portion of the broccoli plant 104. Introduced above, the edible crown 118 of the individual broccoli plants 104 may be imaged, and this imaging, or the image(s) generated by imaging device(s) and/or system(s) of the machine 100, may be utilized to determine whether to harvest the broccoli plants 104. For example, image analysis and/or ML model(s) may be used to determine whether the broccoli plants 104 are ready for harvesting (e.g., ripe, mature, etc.). If so, components of the machine 100 may to harvest the broccoli plants 104 (e.g., the edible crowns 118).

The machine 100 may include robotic arms 120 and end effectors (obscured in FIG. 1) coupled to the robotic arms 120 for harvesting the broccoli plants 104 (or portions thereof) after the broccoli plants 104 pass underneath the hood 114 and are imaged. That is, as shown, the broccoli plants 104 may pass underneath the hood 114 as the machine 100 moves in the direction of travel. Therein, the end effectors may be moved (or otherwise positioned) via the robotic arms 120 to harvest those broccoli plants 104 that are ready. In some instances, the robotic arms 120 may include actuators, a suspension system, or members that are configured to position the end effectors relative to the broccoli plants 104. In some instances, the robotic arms 120 extend from the frame 106, downward (Y-direction), and which couple to respective end effectors. The robotic arms 120, additionally or alternatively, may extend from other portions of the machine 100, such as the hood 114. In some instances, a first end of the robotic arms 120 may couple to the frame 106 (or the hood 114), while a second end of the robotic arms 120 may couple to (or receive) the end effector for positioning the end effector relative to the individual broccoli plants 104 that are ready for harvesting. In this sense, the robotic arms 120 may articulate or position to locate the end effectors.

As will be discussed herein, the end effectors are configured to harvest the broccoli plants 104, and specifically, the edible crown 118 of the broccoli plants 104. The edible crown 118 may be retained within the end effector, cut from the stalk 116, and transferred to a collection location on the machine 100. For example, in some instances, the end effectors may transfer the edible crowns 118 to a conveyor belt or other transfer mechanism, (e.g., flipper, chute, escalator, etc.) that transfers the edible crowns 118 to other portions of the machine 100 or external storage (e.g., side car/bin).

In some instances, the machine 100 includes a platform 122 on which personnel stand. The personnel may perform processing on the edible crowns 118, such as cleaning, removing leaves, sorting (e.g., size, color, shape, maturity, etc.), discarding, repurposing, and so forth. For example, after the edible crowns 118 are harvested, transfer mechanisms (e.g., conveyor belt, ladder, escalator, lift, etc.) may transfer the edible crowns 118 to the platform 122. In some instances, the transfer mechanisms may transfer the edible crowns to a conveyor 124 on the platform 122. As the conveyor 124 operates, the edible crowns 118 may pass along the conveyor 124 and the personnel may inspect the edible crowns 118. Additionally, or alternatively, the personnel may box or package the edible crowns 118 for shipment or distribution.

Although the discussion herein relates to harvesting broccoli, or processes of harvesting broccoli, the machine 100 may be utilized to harvest other crops, such as other standing or stalk-based vegetable crops (e.g., cauliflower, asparagus, celery, lettuce, etc.). In such instances, the machine 100 or portions thereof, may be modified to handle larger or differently shaped plants. Accordingly, it is to be appreciated that the term "broccoli" may be interchanged with other types of crops (or plants) throughout this disclosure.

In some instances, although the machine 100 is discussed herein as being self-propelled, the machine 100 may be configured to be towed, pulled, or carried by a tractor, for example. In such instances, the components of the machine 100 may be powered and/or driven by components of the tractor. For example, components of the machine 100 may be driven by hydraulic motors powered by a hydraulic pump driven from a power take off (PTO) of the tractor.

Figure 2:
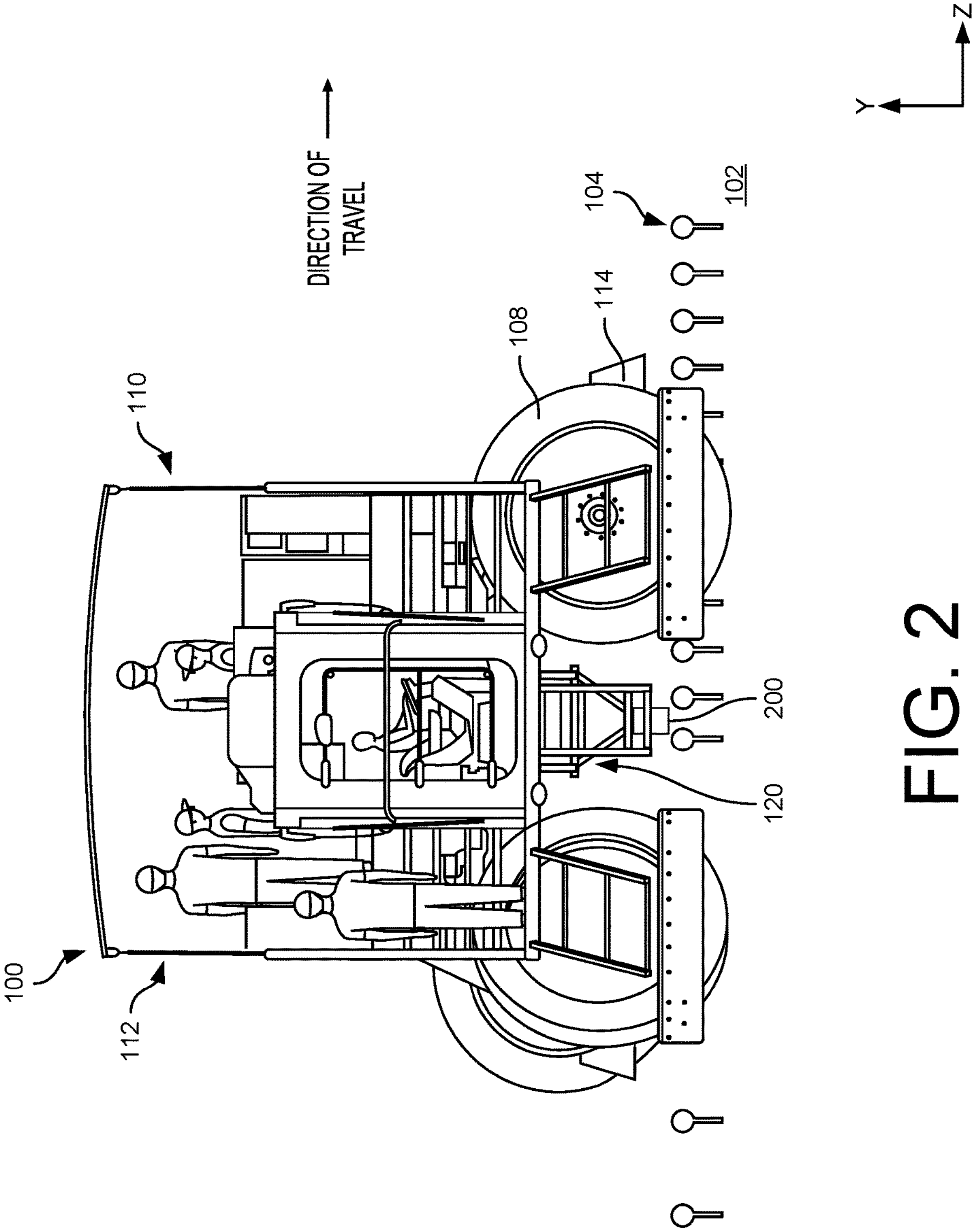
FIG. 2 illustrates a side view of the machine of FIG. 1, according to examples of the present disclosure.

FIG. 2 illustrates a side view of the machine 100, showing an example end effector 200 configured to harvest the broccoli plants 104, according to examples of the present disclosure. Between the first side 110 and the second side 112, or between the wheels 108 on the first side 110 and the wheels 108 on the second side 112, may be an internal space occupied by the robotic arms 120. The robotic arms 120, as discussed above, may descend from the frame 106 or other portions of the machine 100 for harvesting the edible crowns 118 as the broccoli plants 104 pass under the hood 114 and are determined to be ready for harvesting.

Figure 3:
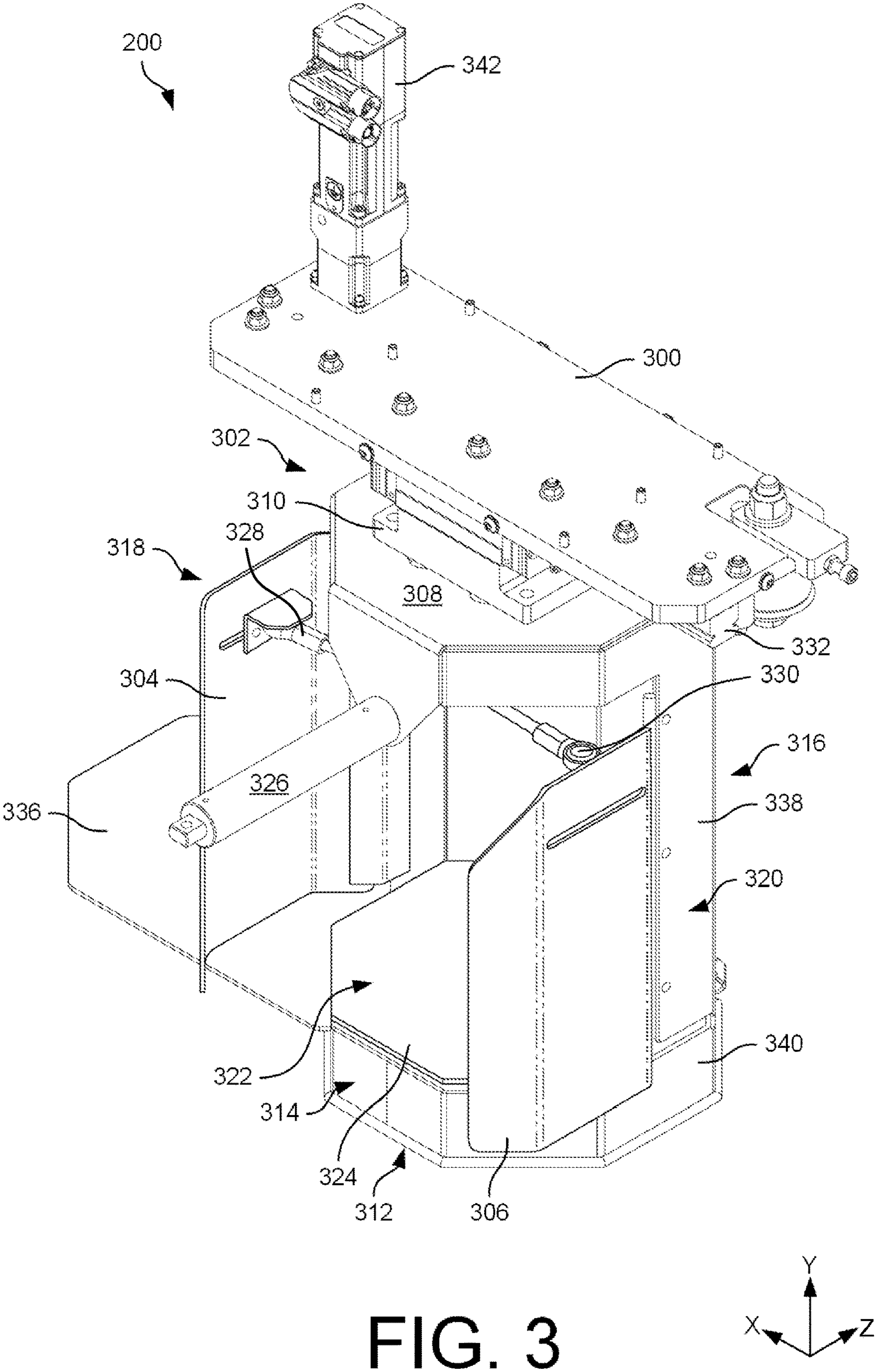
FIG. 3 illustrates a perspective view of an example end effector of the machine of FIG. 1, showing the end effector in an opened state, according to examples of the present disclosure.

FIG. 3 illustrates the end effector 200 in an opened state, according to examples of the present disclosure. In some instances, the end effector 200 includes a mount 300, a housing 302, a first door 304, and a second door 306. The mount 300 may couple to the housing 302, such as a top 308 of the housing 302, via a carriage 310, that may be configured to move the housing 302 (or more generally the end effector 200) in one or more directions (e.g., X-direction). The mount 300 may also couple to the robotic arm 120 such that the end effector 200 is movable via the robotic arm 120 during a harvest of the edible crowns 118. For example, an end of the robotic arm 120 may couple to the mount 300 via a bracket using fasteners.

The housing 302 includes a bottom 312, opposite the top 308 (e.g., spaced apart in the Y-direction), a first side 314, a second side 316 opposite the first side 314 (e.g., spaced apart in the Z-direction), a third side 318, and a fourth side 320 opposite the third side (e.g., spaced apart in the X-direction). In some instances, the first side 314 may be oriented in a direction away from the direction of travel (e.g., trailing side), and the second side 316 may be oriented in a direction towards the direction of travel (e.g., leading side). In some instances, the third side 318 may correspond to a left-side of the housing 302, and the fourth side 320 may correspond to a right-side of the housing 302. The first door 304 hingedly couples to the housing 302 at the third side 318, and the second door 306 hingedly couples to the housing 302 at the fourth side 320.

The first door 304 and the second door 306 are configured to transition between a closed state and an opened state (as shown in FIG. 1). In the closed state, the first door 304 and the second door 306 may restrict access to a receptacle 322 within the housing 302, while in the opened state, the receptacle 322 may be accessible. As will be explained herein, the receptacle 322 is sized and configured to receive the edible crown 118 once the housing 302 descends upon (e.g., over) the edible crown 118. The edible crown 118 is not shown in FIG. 1, however, the edible crown 118 is configured to reside within the receptacle 322. For example, the bottom 312 of the housing 302 may descend (e.g., Y-direction) over the edible crown 118.

In some instances, the receptacle 322 is defined by the housing 302, the first door 304, the second door 306, and a cutting mechanism 324. For example, the housing 302 may define a top and/or sides of the receptacle 322, the first door 304 and the second door 306 (in the closed state) may define sides of the receptacle 322, and the cutting mechanism 324 may define a bottom of the receptacle 322. When the edible crown 118 is within the receptacle 322, the cutting mechanism 324 may be disposed over the bottom of the receptacle 322 such that the edible crown 118 does not fall out through the bottom 312. In this sense, the edible crown 118 may rest (e.g., sit) on the cutting mechanism 324 while residing within the receptacle 322. However, as will be explained herein, the cutting mechanism 324 moves outside of (e.g., external to) the housing 302 (or the receptacle 322), such that the bottom 312 may descend upon the edible crown 118. Thereafter, once the edible crown 118 is disposed in the receptacle 322, the cutting mechanism 324 may be actuated to sever the edible crown 118 from a remaining portion of the broccoli plant 104 (e.g., stalk 116) to dispose the edible crown 118 in the receptacle 322. Once severed, the cutting mechanism 324 may remain within the housing 302 such that the edible crown 118 does not fall out of the housing 302 while the end effector 200 moves to the conveyor 124.

The end effector 200 may include various actuators. For example, a first actuator 326 may operably couple to the first door 304 and the second door 306. The first actuator 326 is shown being coupled to the first side 314 of the housing 302, but may extend into the receptacle 322 for operably coupling to the first door 304 and the second door 306. For example, a first linkage 328 may couple the first actuator 326 to the first door 304, and a second linkage 330 may couple the first actuator 326 to the second door 306. In some instances, the first linkage 328 and the second linkage 330 move simultaneously during actuation of the first actuator 326. In FIG. 1, the first door 304 and the second door 306 are shown in the opened state, however, when the first actuator 326 is actuated, the first linkage 328 and the second linkage 330 may move to pull the first door 304 and the second door 306 into the closed state. In some instances, the first actuator 326 represents a linear actuator, however, other type actuators are envisioned (e.g., screw drive).

A second actuator 342 may operably couple to the carriage 310 to move the housing 302. For example, the carriage 310 may be disposed on a rail 332, and the carriage 310 may couple to a belt engaged with the second actuator 342. As the second actuator 342 is powered, the belt may be driven which may correspondingly move the carriage 310 along the rail 332. The second actuator 342 may be a rotary actuator (e.g., motor). Additional details of the second actuator 342, carriage 310, the rail 332, and the belt are discussed in FIGS. 13A-13C.

In some instances, the end effector 200 includes a shelf 336. In some instances, the shelf 336 may couple to or extend from the housing 302 at the third side 318. When the cutting mechanism 324 is not disposed within the receptacle 322, the cutting mechanism 324 may reside on or above (e.g., Y-direction) the shelf 336. For example, the cutting mechanism 324 may rest on the shelf 336. In some instances, the cutting mechanism 324 rotates between a retracted position in which the cutting mechanism 324 is disposed outside the housing 302, and an extended position in which the cutting mechanism 324 is disposed within the housing 302 (as shown in FIG. 3). Actuation of the cutting mechanism 324 between the retracted position and the extended position, and vice versa, may be accomplished via a third actuator of the end effector 200 (occluded in FIG. 3).

In some instances, the housing 302 includes an upper portion 338 and a bottom portion 340 that resides vertically below the upper portion 338. In some instances, the upper portion 338 defines the top 308, while the bottom portion 340 defines the bottom 312. The upper portion 338 and the bottom portion 340 may be coupled together, for example, along the second side 316. In some instances, the shelf 336 extends from the bottom portion 340, and the first door 304 and the second door 306 are hingedly coupled to the upper portion 338. As such, the first door 304 and the second door 306 may reside vertically above the bottom portion 340. In some instances, the receptacle 322 is defined by the upper portion 338, and the bottom portion 340 may reside external to, or be disposed outside of, the receptacle 322. The cutting mechanism 324 may be configured to reside at least partially within a space (e.g., gap) between the upper portion 338 and the bottom portion 340. Being as the upper portion 338 receives the edible crown 118, the upper portion 338 may be larger in size (e.g., height) than the bottom portion 340.

Figure 4:
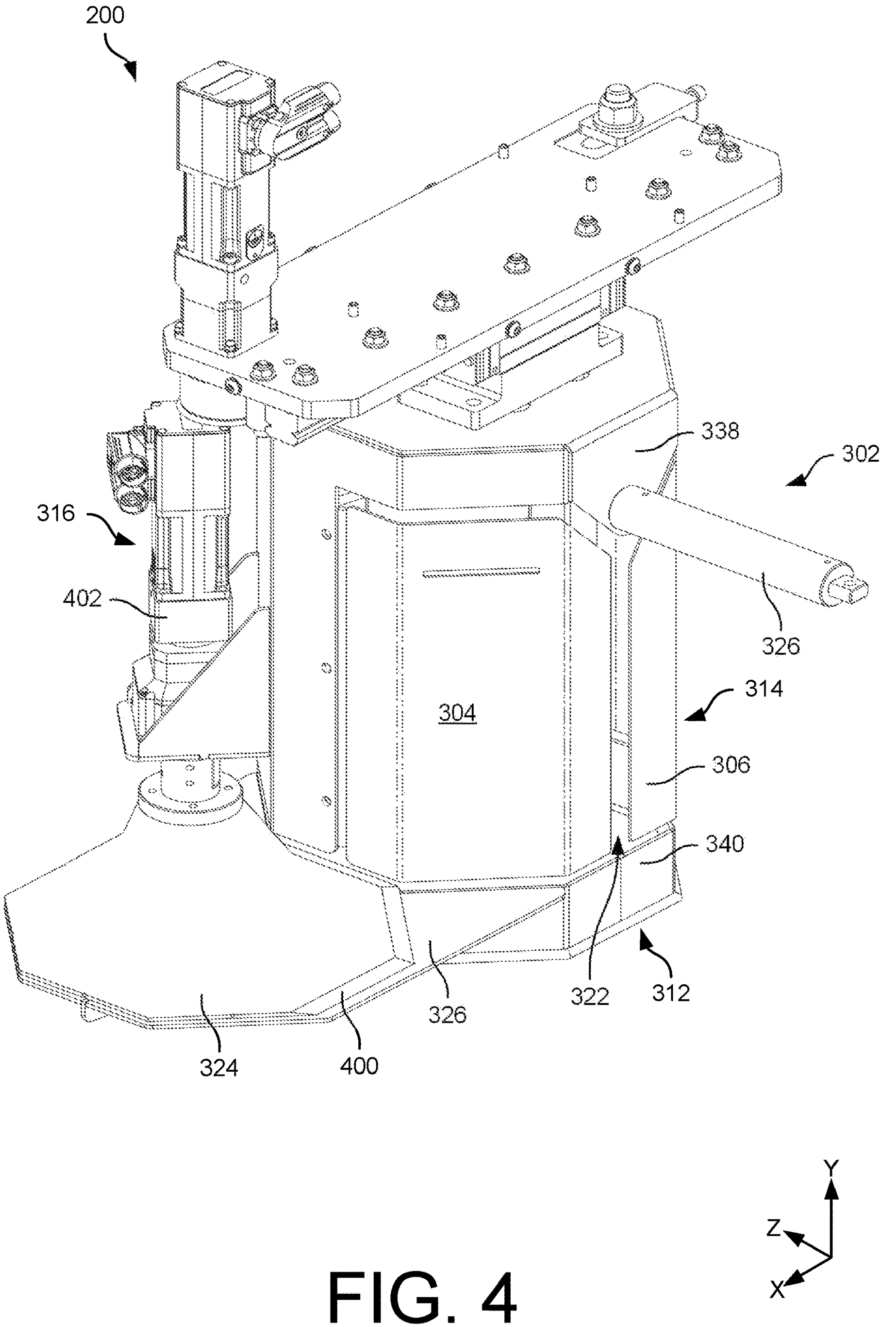
FIG. 4 illustrates a perspective view of the end effector of FIG. 3, showing the end effector in a closed state, according to examples of the present disclosure.

FIG. 4 illustrates the end effector 200 in a closed state, according to examples of the present disclosure. For example, from the opened state shown in FIG. 3, the first actuator 326 may be actuated to retract the first door 304 and the second door 306 to the closed state. From the closed state as shown in FIG. 4, the first actuator 326 may be actuated in an opposite direction to extend the first door 304 and the second door 306 to the opened state.

The cutting mechanism 324 in FIG. 4 is shown residing above and/or on the shelf 336. The shelf 336 may extend from a side of the bottom portion 340 of the housing 302. The cutting mechanism 324 may include a cutting edge 400 that severs the edible crown 118 from the stalk 116. The cutting mechanism 324 couples to a third actuator 402 of the end effector 200. For example, the third actuator 402 may be disposed or coupled to the housing 302 (e.g., the upper portion 338 of the housing 302), and an end of the third actuator 402 may couple to the cutting mechanism 324. As shown, the third actuator 402 may couple to the housing 302 at a location between the first side 314 and the second side 316 of the housing 302. During a first actuation of the third actuator 402, the cutting mechanism 324 may rotate (e.g., counterclockwise about the Y-axis) and into the housing 302 and/or the receptacle 322. More specifically, the cutting mechanism 324 may rotate into a space disposed between the upper portion 338 of the housing 302 and the bottom portion 340 of the housing 302. During a second actuation of the third actuator 402, opposite in direction to the first actuation, the cutting mechanism 324 may rotate (e.g., clockwise about the Y-axis) and out of the housing 302 and/or the receptacle 322. In some instances, the third actuator 402 may represent a rotary actuator (e.g., motor).

In the closed state as shown in FIG. 4, the receptacle 322 may be enclosed via the housing 302 (e.g., the upper portion 338 of the housing 302), the first door 304, and the second door 306. However, given that the cutting mechanism 324 is disposed outside the housing 302 and/or the receptacle 322, the receptacle 322 may be open at the bottom such that the housing 302 may descend upon the edible crown 118 and into the receptacle 322. For example, the edible crown 118 may be inserted into the receptacle 322 via the bottom portion 340 and up into the upper portion 338. Once the edible crown 118 is within the receptacle 322, and discussed herein, the second actuator 342 may actuate to cause the cutting mechanism 324 to sever the edible crown 118 from the stalk 116. Thereafter, the cutting mechanism 324 may remain within the housing 302 such that the edible crown 118 does not fall out of the bottom 312.

Figure 5A:
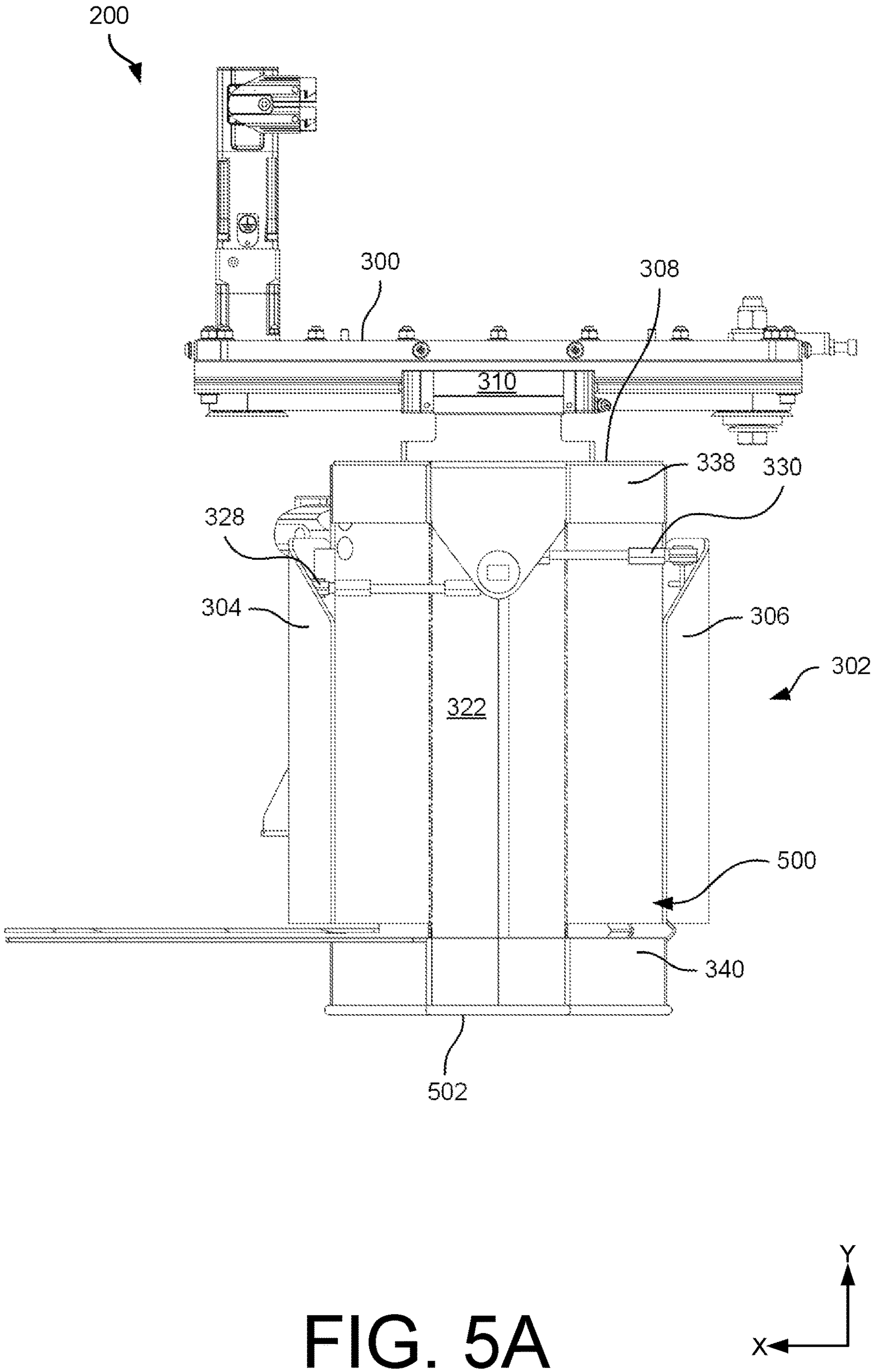
FIGS. 5A-5C illustrate side views of the end effector of FIG. 3, according to examples of the present disclosure.
Figure 5B:
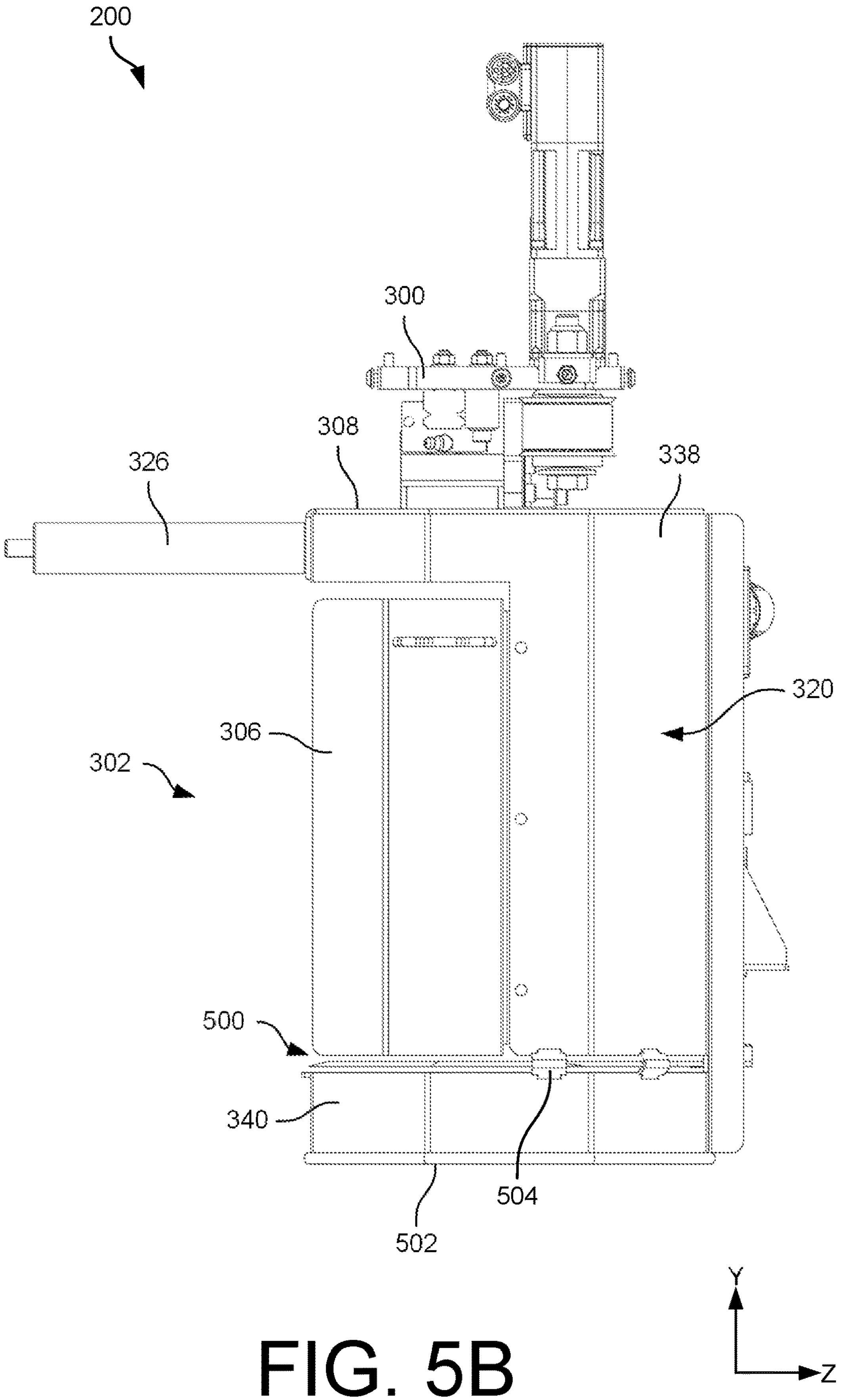
Figure 5C:
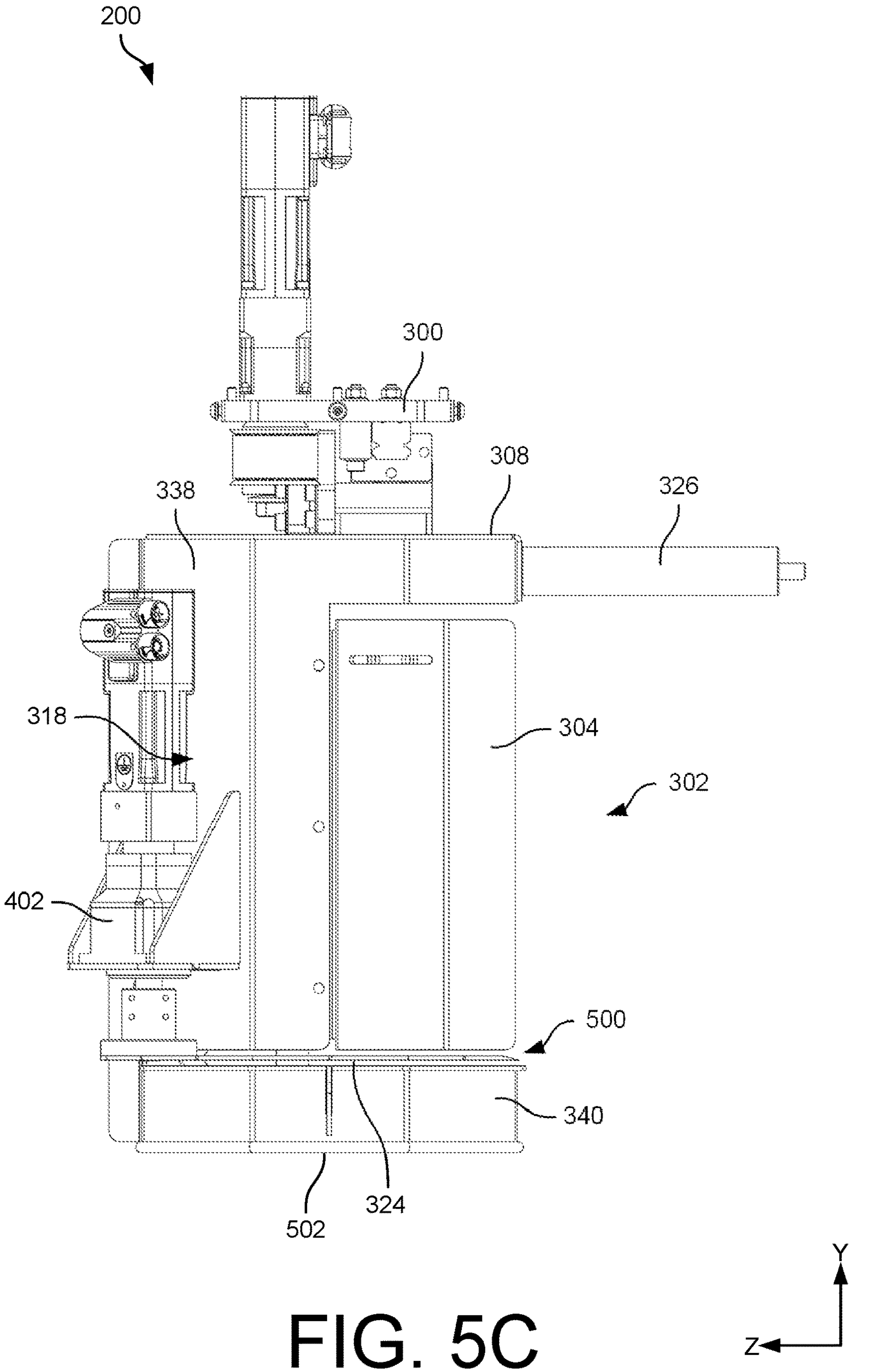

FIGS. 5A-5C illustrate side views of the end effector 200 in the opened state, according to examples of the present disclosure. FIG. 5A may illustrate a front view of the end effector 200 (e.g., the first side 114), FIG. 5B may illustrate the fourth side 320 (e.g., right-side) of the end effector 200, and FIG. 5C may illustrate the third side 318 (e.g., left side) of the end effector 200.

The carriage 310 couples to the top 308 of the housing 302, and is engaged with the mount 300 and the second actuator 342. As shown, the carriage 310 may couple to the upper portion 338 of the housing 302. The first door 304 and the second door 306 are hingedly coupled to the housing 302, such as the upper portion 338 of the housing 302, at the third side 318 and the fourth side 320, respectively. As shown in FIG. 5A, the first actuator 326 couples to the first door 304 via the first linkage 328, and the second door 306 via the second linkage 330. The bottom portion 340 resides vertically beneath the first door 304 and the second door 306. In some instances, the bottom portion 340 extends from the upper portion 338 of housing 302 at the second side 316, such that the cutting mechanism 324 may be rotated into and out of the housing 302. However, a gap 500 is defined between the upper portion 338 of the housing 302 and the bottom portion 340 of this housing 302. This gap 500 permits the cutting mechanism 324 to enter the housing 302 to sever the edible crown 118 from the stalk 116.

The gap 500 may be occupied via the cutting mechanism 324 when the cutting mechanism 324 moves into housing 302 to sever the edible crown 118 from the stalk 116. That is, the gap 500 accommodates the cutting mechanism 324 transitioning into and out of the receptacle 322. For example, when the cutting mechanism 324 moves into the receptacle 322, the cutting mechanism 324 may move through the gap 500. The spacing between the bottom portion 340 of the housing 302 and the upper portion 338 of the housing 302 (or the first door 304 and the second door 306) provides a space for the cutting mechanism 324 to maneuver. In some instances, the bottom portion 340 may not define part of the receptacle 322, but may include a leading edge 502 that functions to strip leaves, branches, stems, or other foliage from the broccoli plants 104 before harvesting.

In some instances, bumpers 504 are disposed between the upper portion 338 and the bottom portion 340. In some instances, the bumpers 504 may be located on the fourth side 320 of the housing 302. The bumpers 504 may receive a portion of the cutting edge 400 of the cutting mechanism 324. For example, the cutting edge 400 may fit into or at least partially into the bumpers 504 as the cutting mechanism 324 severs the edible crown 118 from the stalk 116, and while the end effector 200 moves to deposit the edible crown 118 into the conveyor 124.

Figure 6:
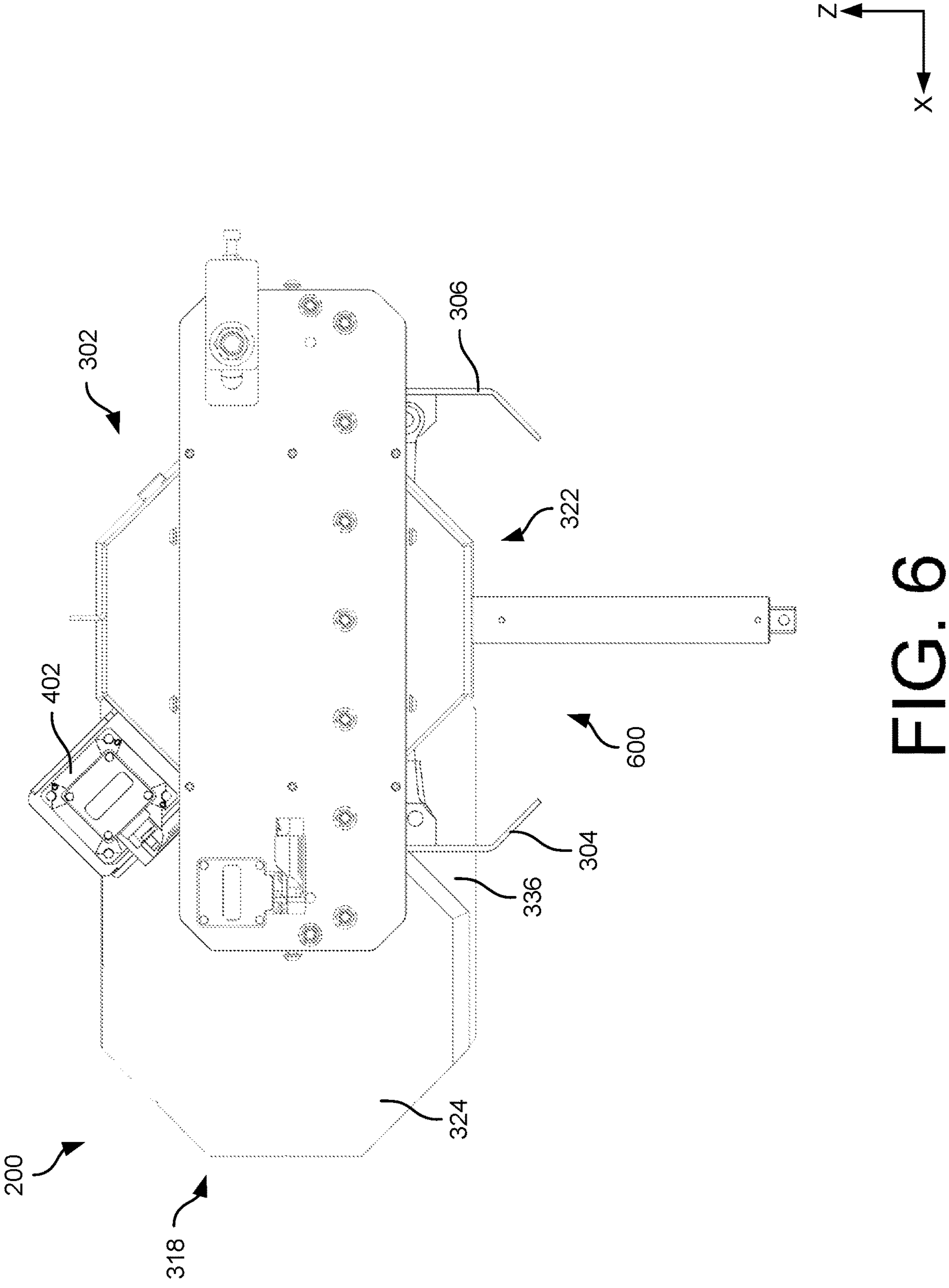
FIG. 6 illustrates a top view of the end effector of FIG. 3, according to examples of the present disclosure.

FIG. 6 illustrates a top view of the end effector 200 in the opened state, according to examples of the present disclosure. In some instances, the housing 302 includes a hexagonal shape (e.g., X-Z plane). The housing 302 may include a width (X-direction) to accommodate a width of the edible crowns 118, a depth (Z-direction) to accommodate a depth of the edible crowns 118, and a height (Y-direction) to accommodate a height of the edible crowns 118. In some instances, the upper portion 338 and/or the bottom portion 340 of the housing 302 may include a similar or different shape. As shown, the shelf 336 may be disposed on the third side 318 of the housing 302, and the cutting mechanism 324 may be disposed to the third side 318 of the housing 302 prior to harvesting the edible crowns 118. The third actuator 402 is configured to actuate the cutting mechanism 324 into the receptacle 322, and within the gap 500 between the upper portion 338 of the housing 302 and the bottom portion 340 of the housing 302.

The edible crowns 118 may be ejected from the housing 302, or the receptacle 322, via an opening 600. The opening 600 may extend between the first door 304 and the second door 306 (e.g., in the X-direction), and may extend between the bottom portion 340 and the upper portion 338 of the housing 302. The opening 600 may be formed when the first door 304 and/or the second door 306 are in the opened state. The opening 600 permits the edible crowns 118 to be removed from the housing 302, or the receptacle 322, following harvest.

Figure 7:
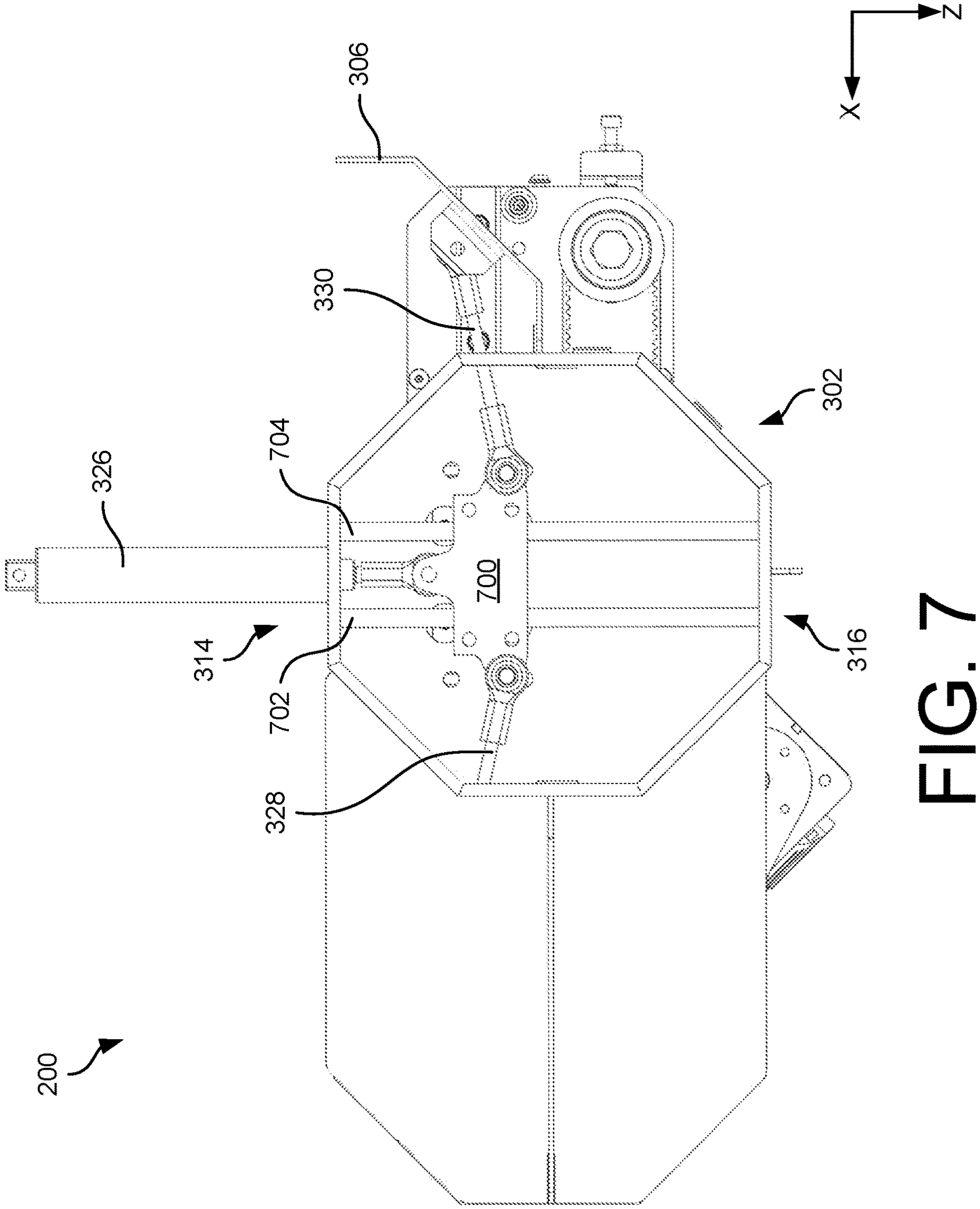
FIG. 7 illustrates a bottom view of the end effector of FIG. 3, according to examples of the present disclosure.

FIG. 7 illustrates a bottom view of the end effector 200 in the opened state, according to examples of the present disclosure. The first actuator 326 couples to the first linkage 328 and the second linkage 330 via a sled 700. In some instances, the sled 700 is operably coupled to a first rail 702 (e.g., bar, post, track, etc.) and a second rail 704 (e.g., bar, post, track, etc.) such that the sled 700 traverses along the first rail 702 and the second rail 704. For example, in FIG. 7, the first actuator 326 may be in a retracted position, and the sled 700 maybe positioned proximate to the first side 314 of the housing 302. As the first actuator 326 extends (e.g., in the Z-direction) the sled 700 may move along the first rail 702 and the second rail 704 towards the second side 316 of the housing 302. Given the coupling of the first linkage 328 and the second linkage 330 to the sled 700, the first door 304, and the second door 306, respectively, as the first actuator 326 extends, the first door 304 and the second door 306 may be pulled into the closed state. Conversely, as the first actuator 326 retracts, the first door 304 and the second door 306 may be pushed open.

The first linkage 328 and the second linkage 330 may each include a first end and a second end. The first end may couple to the sled 700, for example, on opposing sides of the sled 700 (e.g., spaced apart in the X-direction). The second end may couple to the first door 304 and the second door 306, respectively. In some instances, the first linkage 328 and the second linkage 330 may include a ball-joint (e.g., rod end ball joint) located at the first end and the second end, respectively. The ball joints allow the first linkage 328 and the second linkage 330 to pivot as the first actuator 326 extends and retracts to open and close the first door 304 and the second door 306, respectively.

The first rail 702 and the second rail 704 may maintain a position and/or alignment of the sled 700 during actuation of the first actuator 326. For example, the first rail 702 and the second rail 704 may be parallel to an actuation direction of the first actuator 326. The sled 700 may include features for receiving the first rail 702 and the second rail 704 (e.g., bearings, bushings, etc.), such that the sled 700 may translate along the first rail 702 and the second rail 704. As shown, the first rail 702 and the second rail 704 may extend between internal sidewalls or an interior surface of the housing 302.

Figure 8:
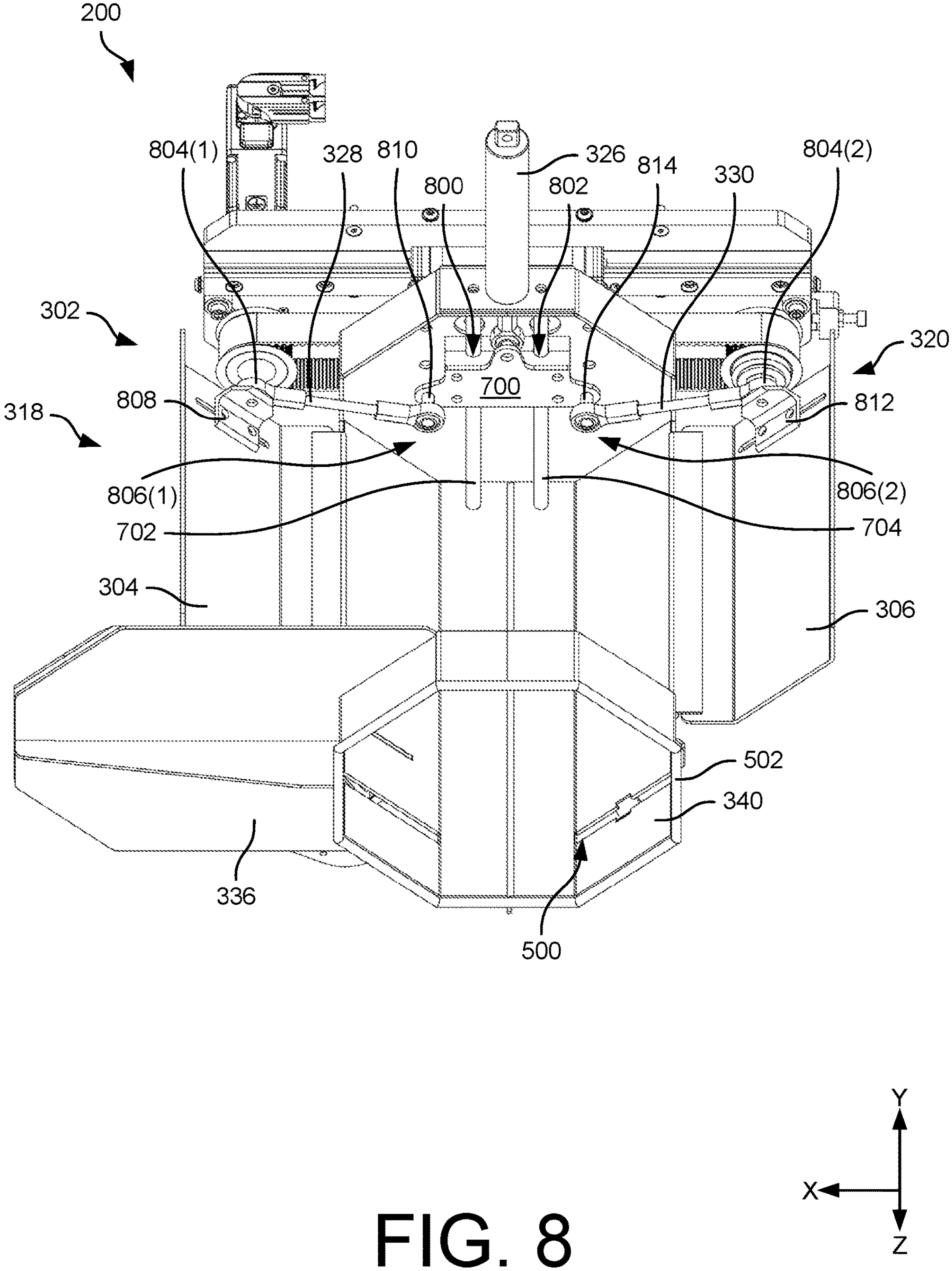
FIG. 8 illustrates a bottom view of the end effector of FIG. 3, showing example components for transitioning the end effector between an opened state and a closed state, according to examples of the present disclosure.

FIG. 8 illustrates a bottom view of the end effector 200 in the opened state, showing an operation of the first door 304 and the second door 306 between the opened state and the closed state, according to examples of the present disclosure.

The first rail 702 and the second rail 704 are shown disposed within the housing 302, between opposed sidewalls and/or an interior surface of the housing 302 (e.g., in the Z-direction). The first rail 702 and the second rail 704 may be spaced apart from one another, between the third side 318 and the fourth side 320 (e.g., in the X-direction). The sled 700 receives the first rail 702 and the second rail 704, and the sled 700 is configured to translate along the first rail 702 and the second rail 704. For example, the sled 700 may include a first passageway 800 in which the first rail 702 is received, and a second passageway 802 in which the second rail 704 is received. During actuation of the first actuator 326, the first passageway 800 may translate over/along the first rail 702, while the second passageway 802 may translate over/along the second rail 704. The first passageway 800 and the second passageway 802 may be lined with bearings and/or bushings to reduce friction between the sled 700, the first rail 702, and the second rail 704, respectively. As shown, the first rail 702 and the second rail 704 may be cylindrical in nature, however, other shapes are envisioned.

The first linkage 328 includes a first end 804(1) coupled to the first door 304, and a second end 806(1) coupled to the sled 700. In some instances, the first end 804(1) of the first linkage 328 couples to a first bracket 808 that is coupled to the first door 304. The second end 806(1) of the first linkage 328 may couple either directly or indirectly to the sled 700. For example, a first rod 810 may couple the second end 806(1) to the sled 700. In some instances, the second end 806(1) may pivot about the first rod 810 as the first actuator 326 actuates. Additionally, the second linkage 330 includes a first end 804(2) coupled to the second door 306, and a second end 806(2) coupled to the sled 700. In some instances, the first end 804(2) of the second linkage 330 couples to a second bracket 812 that is coupled to the second door 306. The second end 806(2) of the second linkage 330 may couple either directly or indirectly to the sled 700. For example, a second rod 814 may couple the second end 806(2) to the sled 700. In some instances, the second end 806(2) may pivot about the second rod 814 as the first actuator 326 actuates. The first linkage 328, the second linkage 330, the first rail 702, the second rail 704, and the sled 700 may be located more proximate to the top 308 of the housing 302 than the bottom 312 of the housing 302. The first linkage 328, the second linkage 330, the first rail 702, the second rail 704, and/or the sled 700 may also couple to, or be disposed in, the upper portion 338 of the housing 302.

As further shown, the bottom portion 340 of the housing 302 may reside vertically below the first door 304 and the second door 306 coupled to the upper portion 338. The gap 500 exists between the upper portion 338 and the bottom portion 340 to provide a space that permits the cutting mechanism 324 to extend into and out of the receptacle 322. The bottom portion 340 also includes the leading edge 502 that may push foliage or leaves away from the edible crown 118 during harvest of the edible crown 118. The shelf 336 may further extend from the bottom portion 340.

Figure 9A:
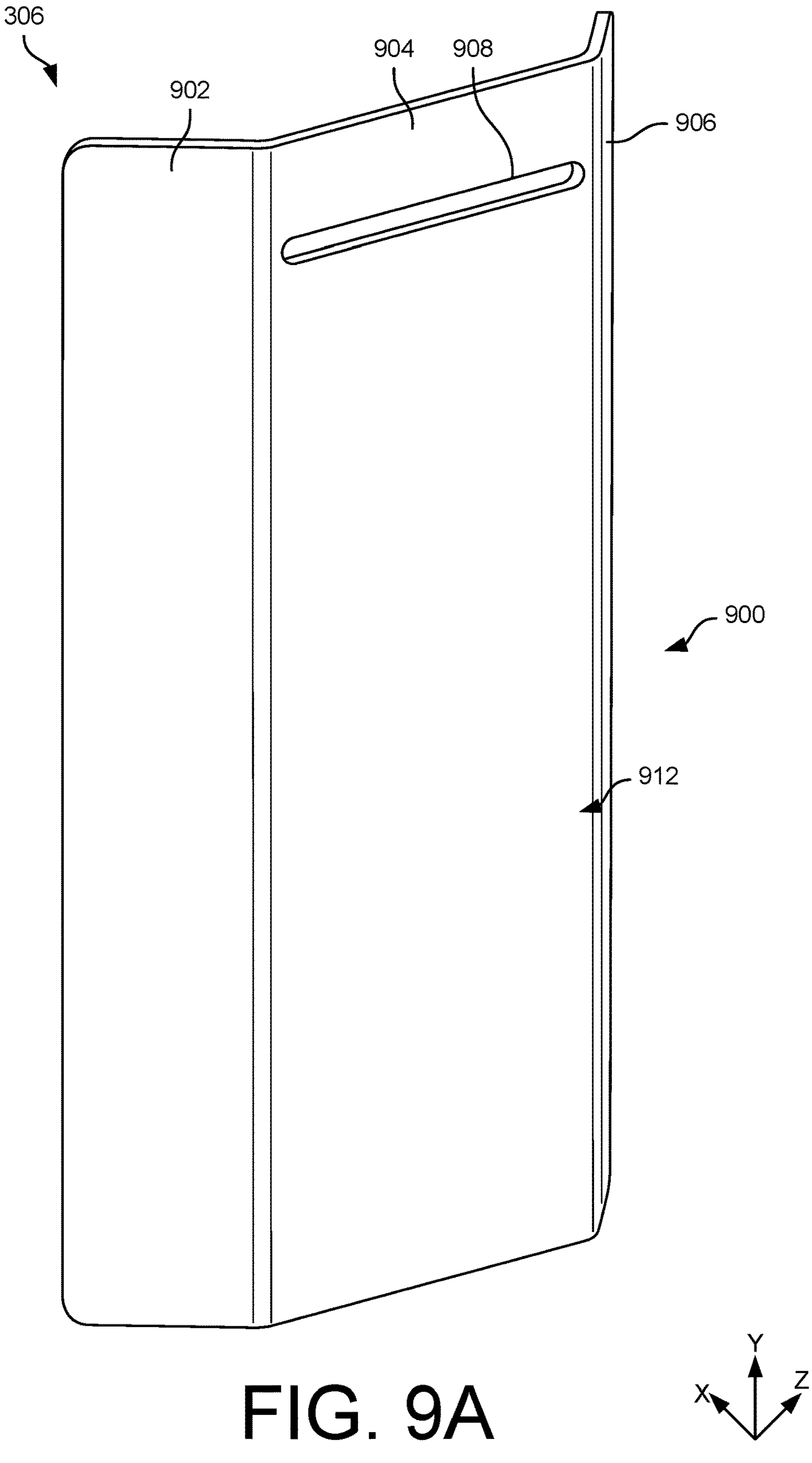
FIGS. 9A and 9B illustrate an example door of the end effector of FIG. 3, according to examples of the present disclosure.
Figure 9B:
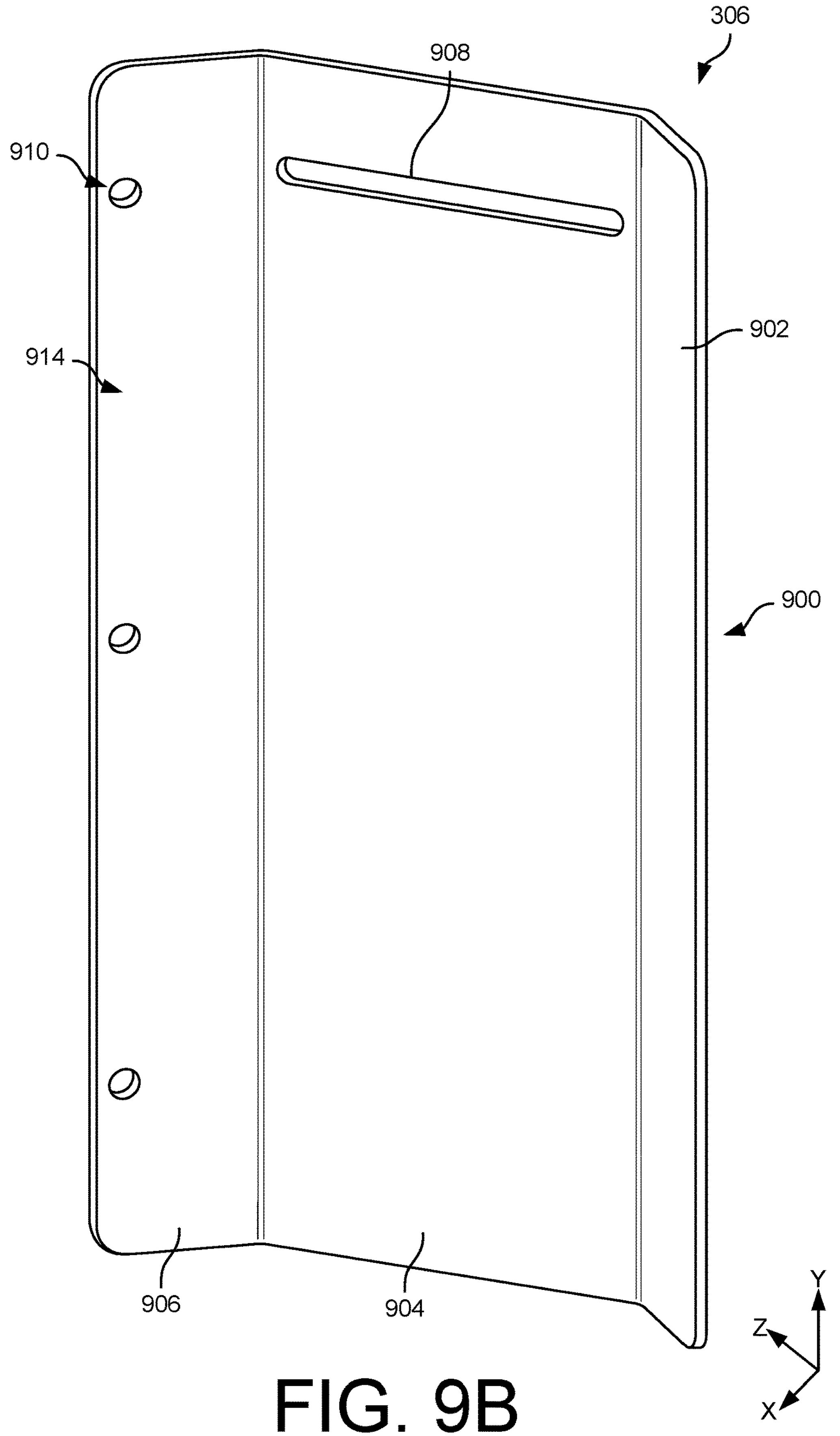

FIGS. 9A and 9B illustrate the second door 306 of the end effector 200, according to examples of the present disclosure. FIG. 9A may illustrate an exterior view of the second door 306, and FIG. 9B may illustrate an interior view of the second door 306. Although the discussion is within regard to the second door 306, it is to be understand that the first door 304 may include similar components, and/or function similarly as described with regard to the second door.

The second door 306 includes a body 900 having a first portion 902, a second portion 904, and a third portion 906. In some instances, the first portion 902 and the third portion 906 extend from the second portion 904. For example, the second portion 904 may be disposed between the first portion 902 and the third portion 906. In some instances, the first portion 902 and the third portion 906 extend transversely from the second portion 904. The shape of the first portion 902, the second portion 904, and the third portion 906 define the shape of the housing 302. For example, in the closed state, the housing 302 may include the hexagonal shape that is accomplished at least in part via the orientation of the first portion 902, the second portion 904, and the third portion 906.

The second portion 904 includes a slit 908, which may be used to couple the second bracket 812 to the second door 306. For example, fasteners may be disposed at least partially through the slit 908 and into the second bracket 812 for coupling the second bracket 812 and the second linkage 330 to the second door 306. The third portion 906 may include one or more holes 910 for receiving a hinge that operably couples the second door 306 to the housing 302, such as the upper portion 338. For example, the operable coupling of the second door 306 to the housing 302 permits the second door 306 to transition between the closed state and the opened state during actuation of the first actuator 326.

The second door 306 also includes an exterior surface 912 and an interior surface 914. The exterior surface 912 may be oriented in a direction away from the receptacle 322, while the interior surface 914 may be oriented in a direction towards the receptacle 322. When the edible crown 118 is harvested, the edible crown 118 may reside within the interior surface 914.

Figure 10A:
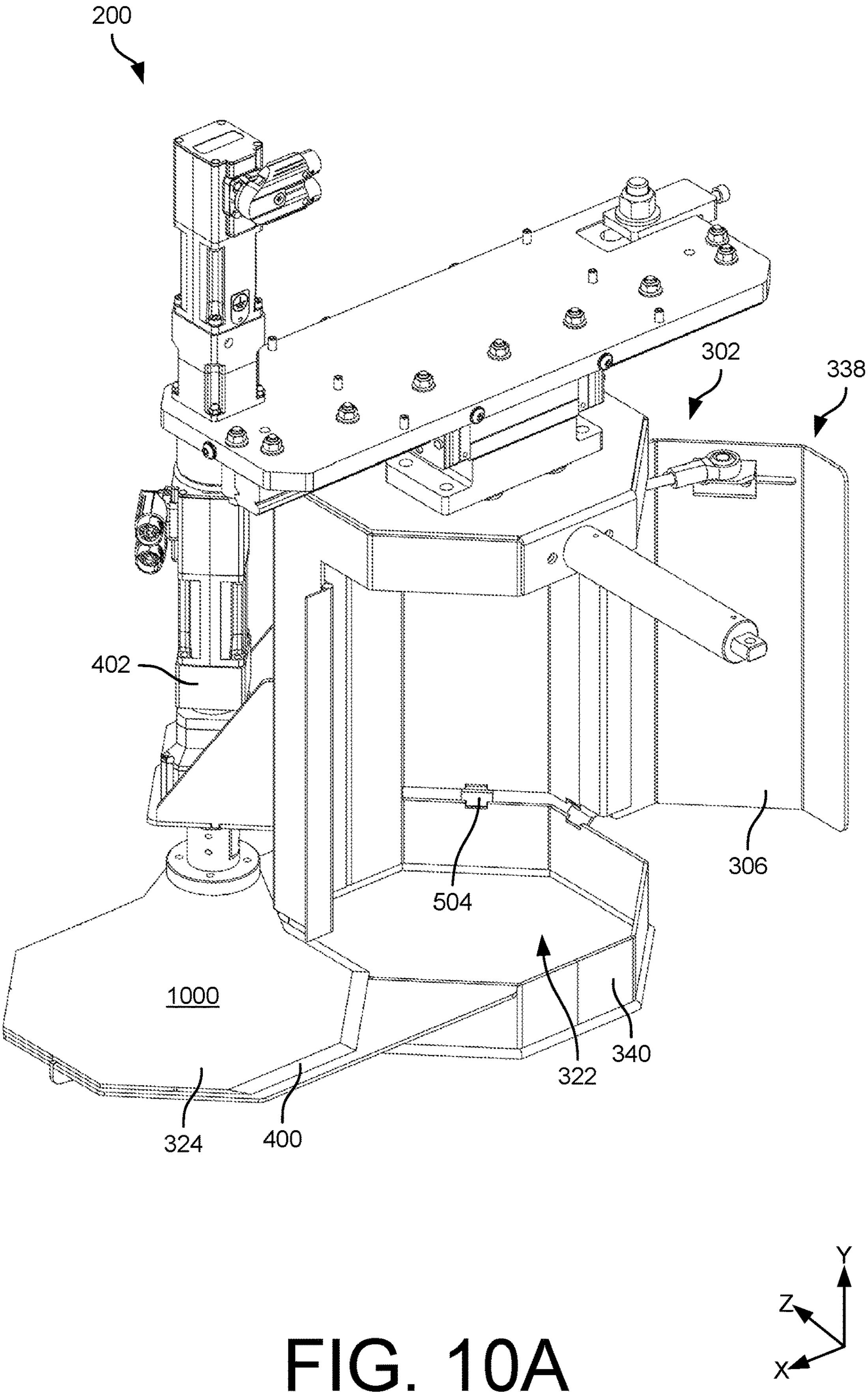
FIGS. 10A and 10B illustrate the end effector of FIG. 3, showing an example movement of an example cutting mechanism of the end effector, according to examples of the present disclosure.
Figure 10B:
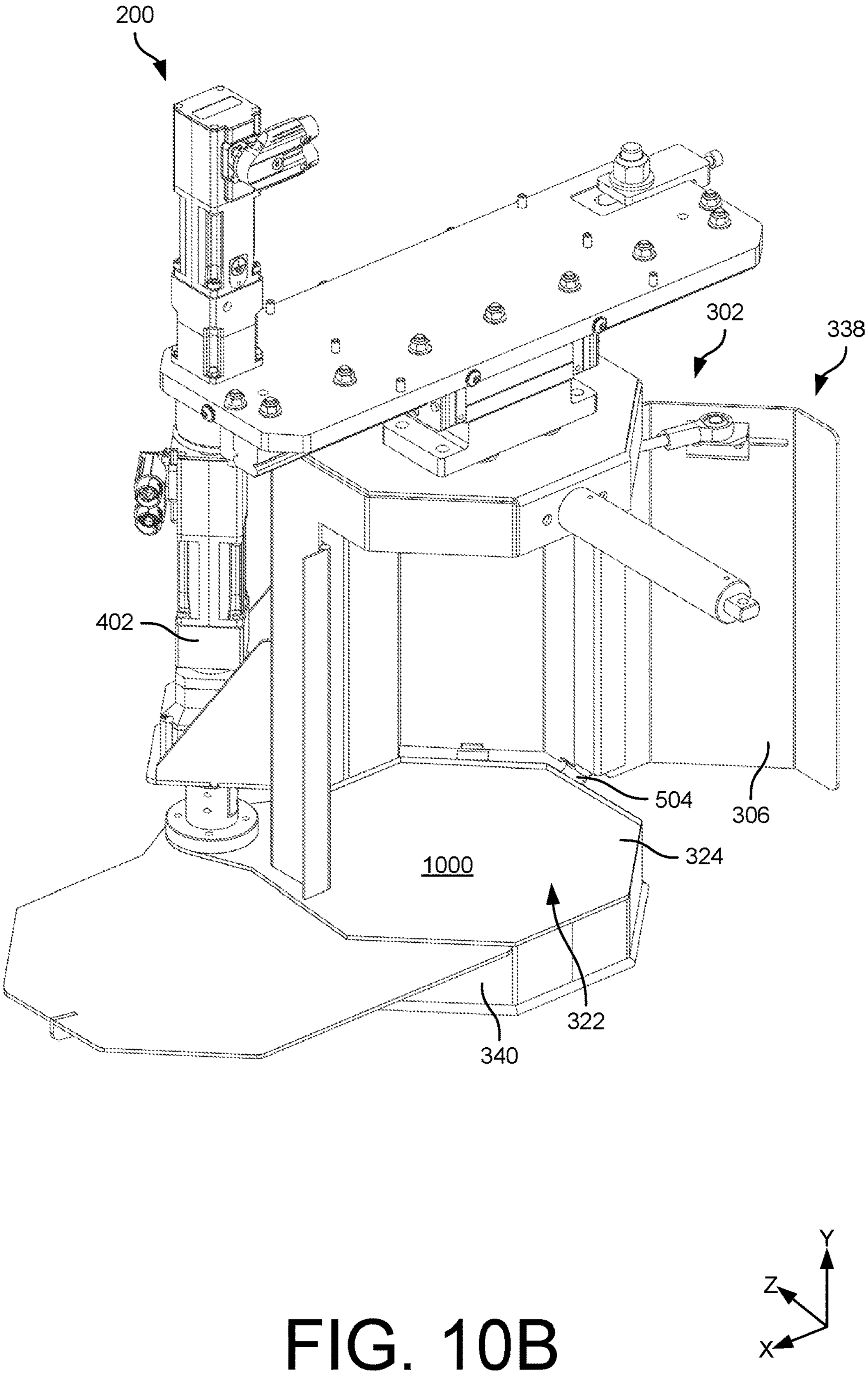

FIGS. 10A and 10B illustrate an operation of the cutting mechanism 324 of the end effector 200, according to examples of the present disclosure. In FIG. 10A, the cutting mechanism 324 is shown in a retracted position and disposed external to the receptacle 322. In FIG. 10B, the cutting mechanism 324 is shown in an extended position and disposed at least partially within the receptacle 322. In FIGS. 10A and 10B, the first door 304 is shown removed to illustrate the operation of the cutting mechanism 324 between the retracted position and the extended position.

In the retracted position, the cutting mechanism 324 is disposed external to the receptacle 322 such that the end effector 200 may descend upon the edible crown 118. As the edible crown 118 enters into the receptacle 322, via the bottom portion 340, the third actuator 402 may actuate to sever the edible crown 118 from the stalk 116. Once severed, the cutting mechanism 324 remains in extended position to enclose the receptacle 322 and prevent the edible crown 118 falling out of the housing 302 (e.g., via the bottom portion 340). For example, if the cutting mechanism 324 were to move to the retracted position (as shown in FIG. 10A) with the edible crown 118 residing in the receptacle 322, the edible crown 118 would fall out of the housing 302. However, the cutting mechanism 324 remains in the extended position to secure the edible crown 118 within the housing 302. More specifically, the cutting mechanism 324 includes a top surface 1000 on which the edible crown 118 rests following a severing from the stalk 116. For example, after the edible crown 118 is severed from the stalk 116, the edible crown 118 may sit (e.g., stand) on the top surface 1000.

As the end effector 200 moves to the conveyor 124, for example, the first door 304 and the second door 306 may open to release the edible crown 118 from the receptacle 322. Therein, once the edible crown 118 is removed from the receptacle 322, the cutting mechanism 324 may be retracted via actuation of the third actuator 402. Additionally, in the retracted position, the bottom of the receptacle 322 is not enclosed and as such, the housing 302 may descend upon another edible crown 118 ready for harvesting.

The bumpers 504 are provided between the upper portion 338 and the bottom portion 340 to receive the cutting edge 400 of the cutting mechanism 324. The bumpers 504 may also support the cutting mechanism 324 during harvest. For example, once the edible crown 118 is cut and sits on the top surface 1000, the engagement between the cutting mechanism 324 and the bumpers 504 may support a weight of the edible crown 118 to prevent bending of the cutting mechanism 324, as well as torques or moments being applied to the third actuator 402.

Figure 11A:
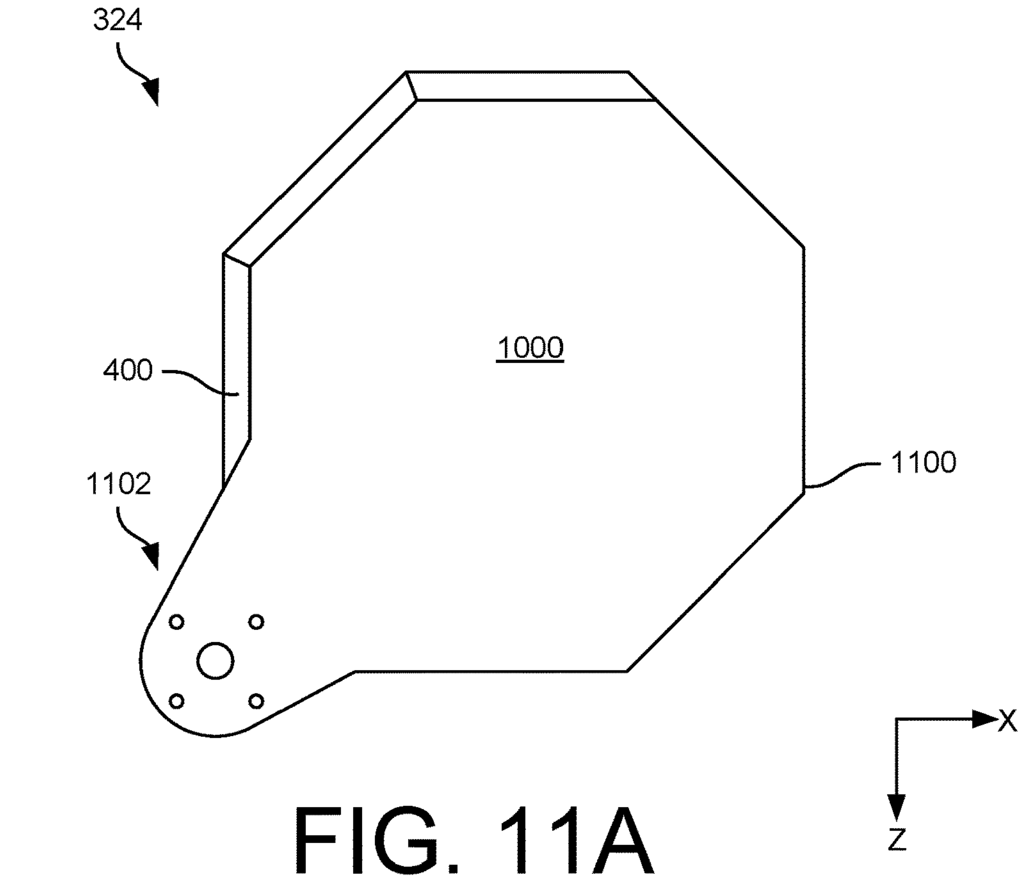
FIGS. 11A and 11B illustrate the cutting mechanism of the end effector of FIGS. 10A and 10B, according to examples of the present disclosure.
Figure 11B:
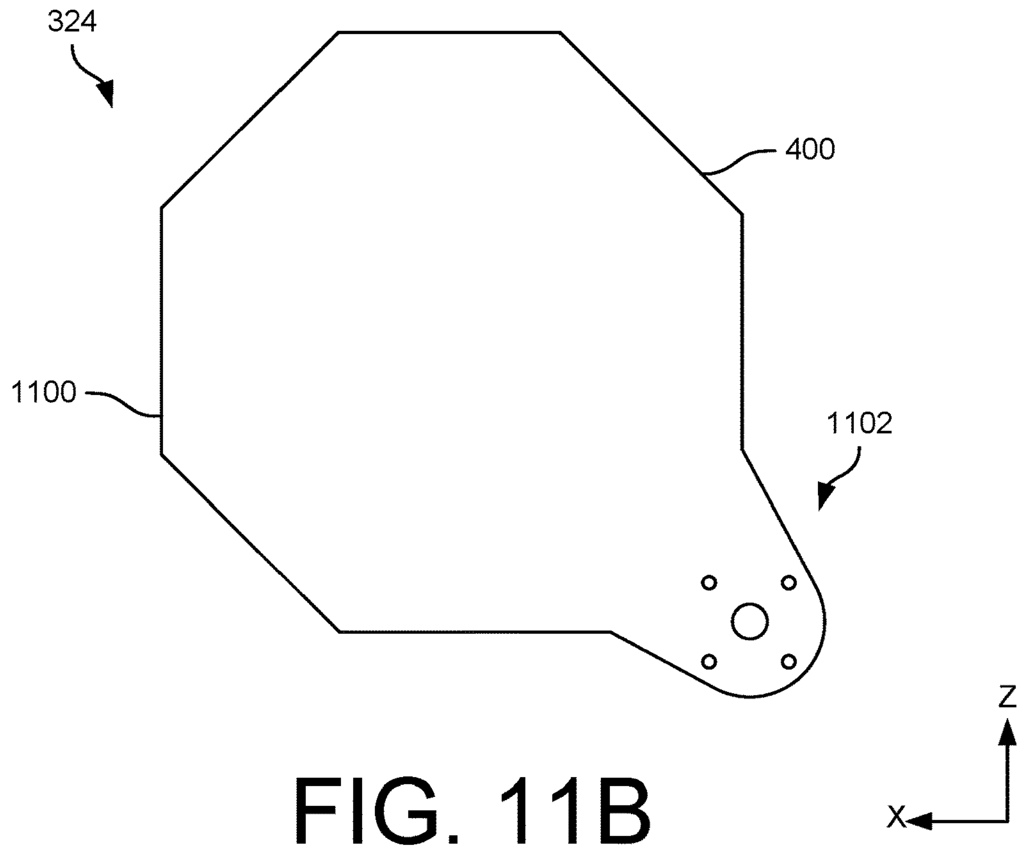

FIGS. 11A and 11B illustrate the cutting mechanism 324, according to examples of the present disclosure. FIG. 11A may illustrate a top view of the cutting mechanism 324, and FIG. 11B may illustrate a bottom view of the cutting mechanism 324.

The cutting mechanism 324 is shown including a generally hexagonal shape. The hexagonal shape of the cutting mechanism 324 may correspond to the hexagonal shape of the housing 302. The cutting mechanism includes the cutting edge 400 that severs the edible crown 118 from the stalk 116. The cutting edge 400 may be disposed along one or more sides, or facets, of the cutting mechanism 324. During a severing of the edible crown 118 from the stalk 116, the cutting edge 400 may rotate through the stalk 116 in order to cut the edible crown 118 from the stalk 116 (e.g., about the Y-axis). For example, the cutting mechanism 324 may be configured to rotate, spin, or swivel for cutting through a thickness of the stalk 116. A trailing edge 1100, opposite the cutting edge 400, may trail the cutting edge 400. In some instances, the cutting mechanism 324 may cut through the stalk in a direction that is substantially perpendicular to a direction in which the broccoli plant 104 grows.

The cutting mechanism 324 may also include a flange 1102 that couples the cutting mechanism 324 to the third actuator 402. For example, fasteners may be used to secure the flange 1102 to an end of the third actuator 402. Although a particular shape of the cutting mechanism 324 is shown, other shapes are envisioned (e.g., circular, square, etc.). Additionally, although a single cutting mechanism 324 is shown, the end effector 200 may include multiple cutting mechanisms. By way of illustration, a first cutting mechanism may translate into the housing 302 from a first direction (e.g., from the third side 318), and a second cutting mechanism may translate into the housing 302 from a second direction (e.g., from the fourth side 320). In this instance, both the first cutting mechanism and the second cutting mechanism may enclose the bottom of the receptacle 322 to retain the edible crown 118.

In some instances, the cutting mechanism 324 includes a blade, knife, saw, and so forth. The cutting edge 400 may include serrations or may be plain. The first actuator 326, as well as the third actuator 402, may be electric or motorized and controlled by logic or other hardware of the machine 100.

Figure 12:
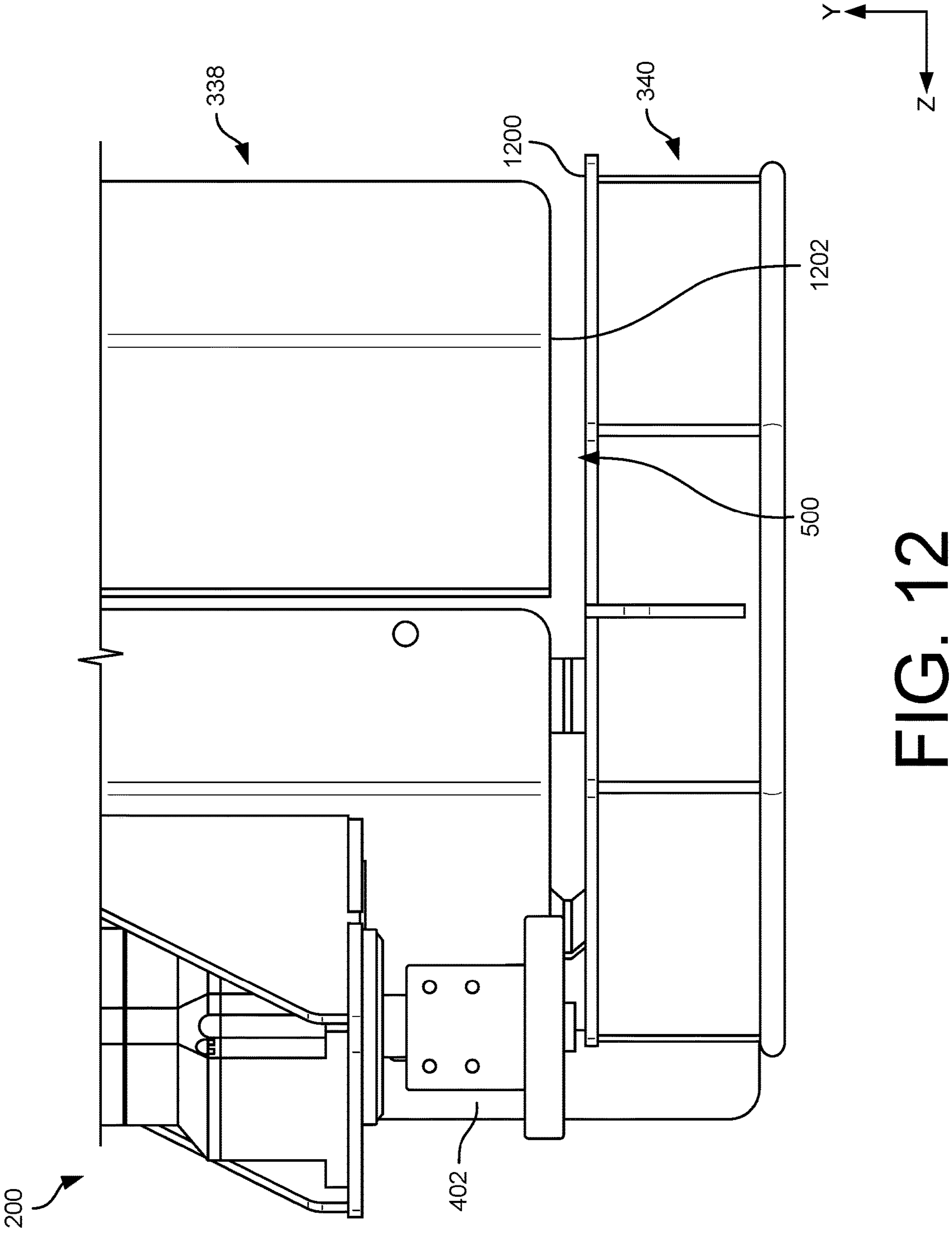
FIG. 12 illustrates an example passageway of the end effector of FIG. 3 for receiving the cutting mechanism of the end effector of FIGS. 11A and 11B, according to examples of the present disclosure.

FIG. 12 illustrates a partial side view of the end effector 200, showing the gap 500 through which the cutting mechanism 324 is configured is configured to pass and/or be disposed between the retracted position and the extended position, according to examples of the present disclosure. The cutting mechanism 324 is shown removed in FIG. 12. For example, the gap 500 is disposed between a top 1200 of the bottom portion 340, and a bottom 1202 of the upper portion 338. As shown, the gap 500 may not extend around an entire perimeter between the upper portion 338 and the bottom portion 340, so as to couple the upper portion 338 and the bottom portion 340 together. The third actuator 402 is further shown to receive the cutting mechanism 324 for moving the cutting mechanism 324 into and out of the receptacle 322. The gap 500 is sized to receive the cutting mechanism 324.

Figure 13A:
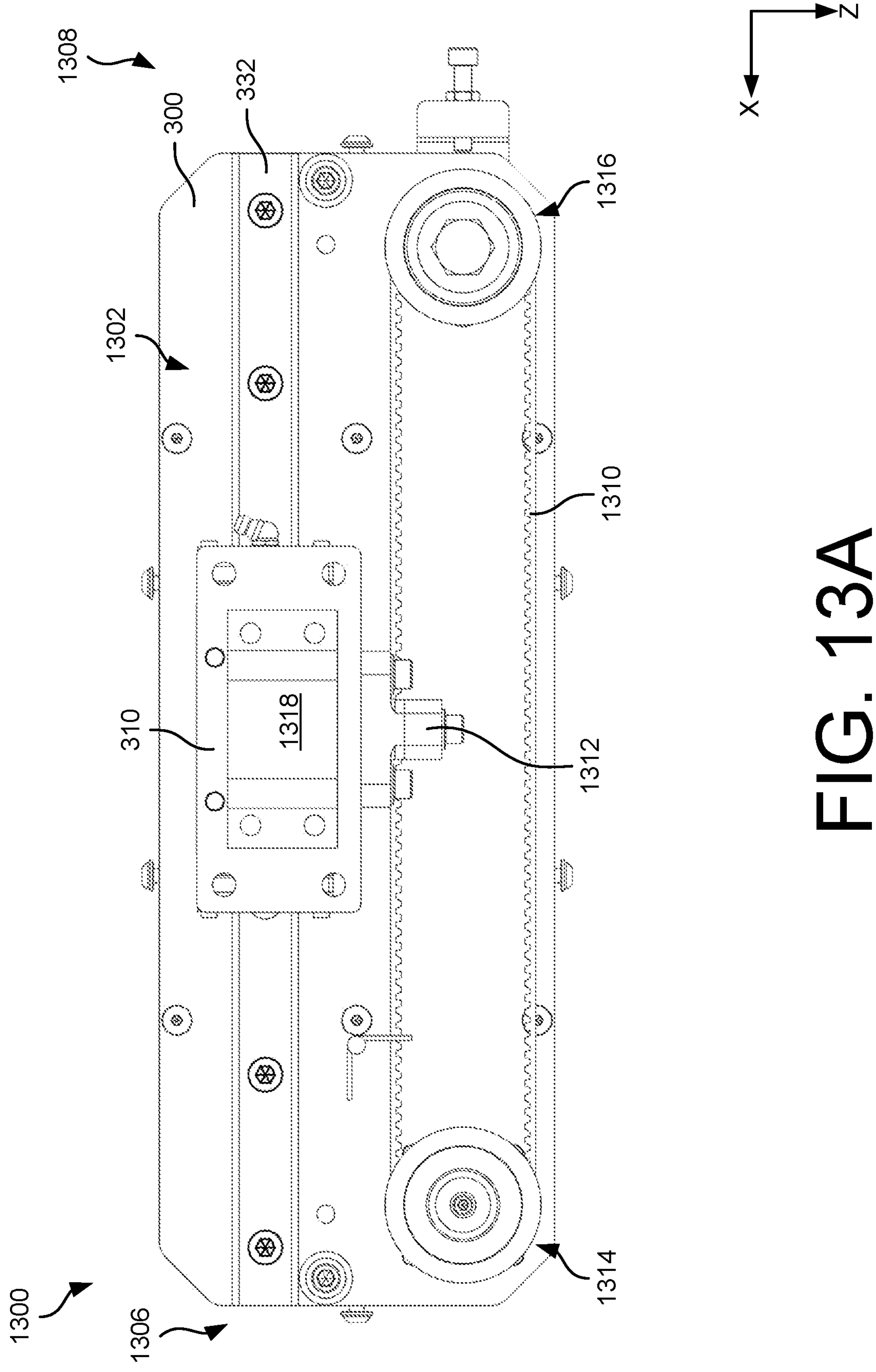
FIGS. 13A-13C illustrate an example positioning system of the end effector of FIG. 3, according to examples of the present disclosure.
Figure 13B:
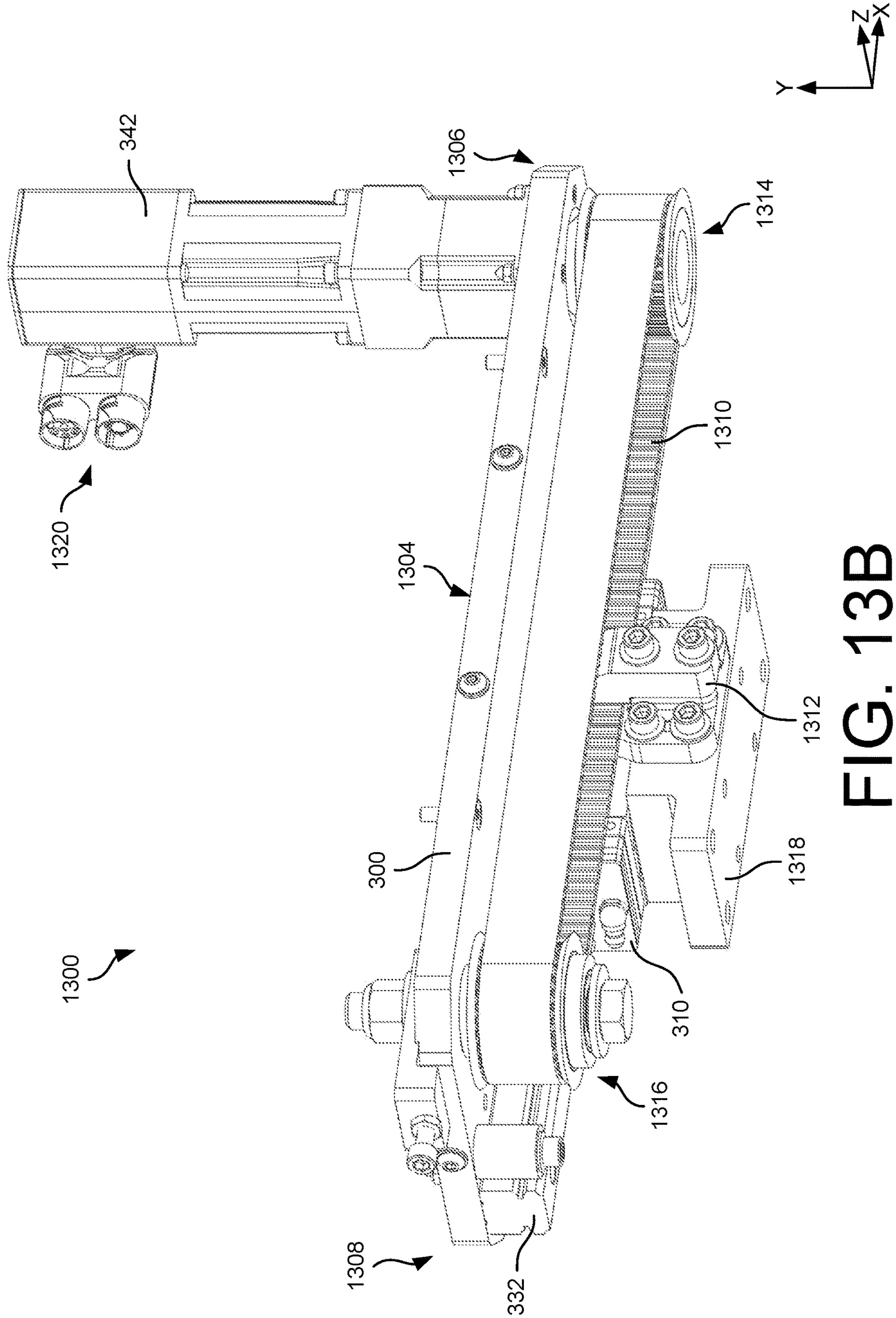
Figure 13C:
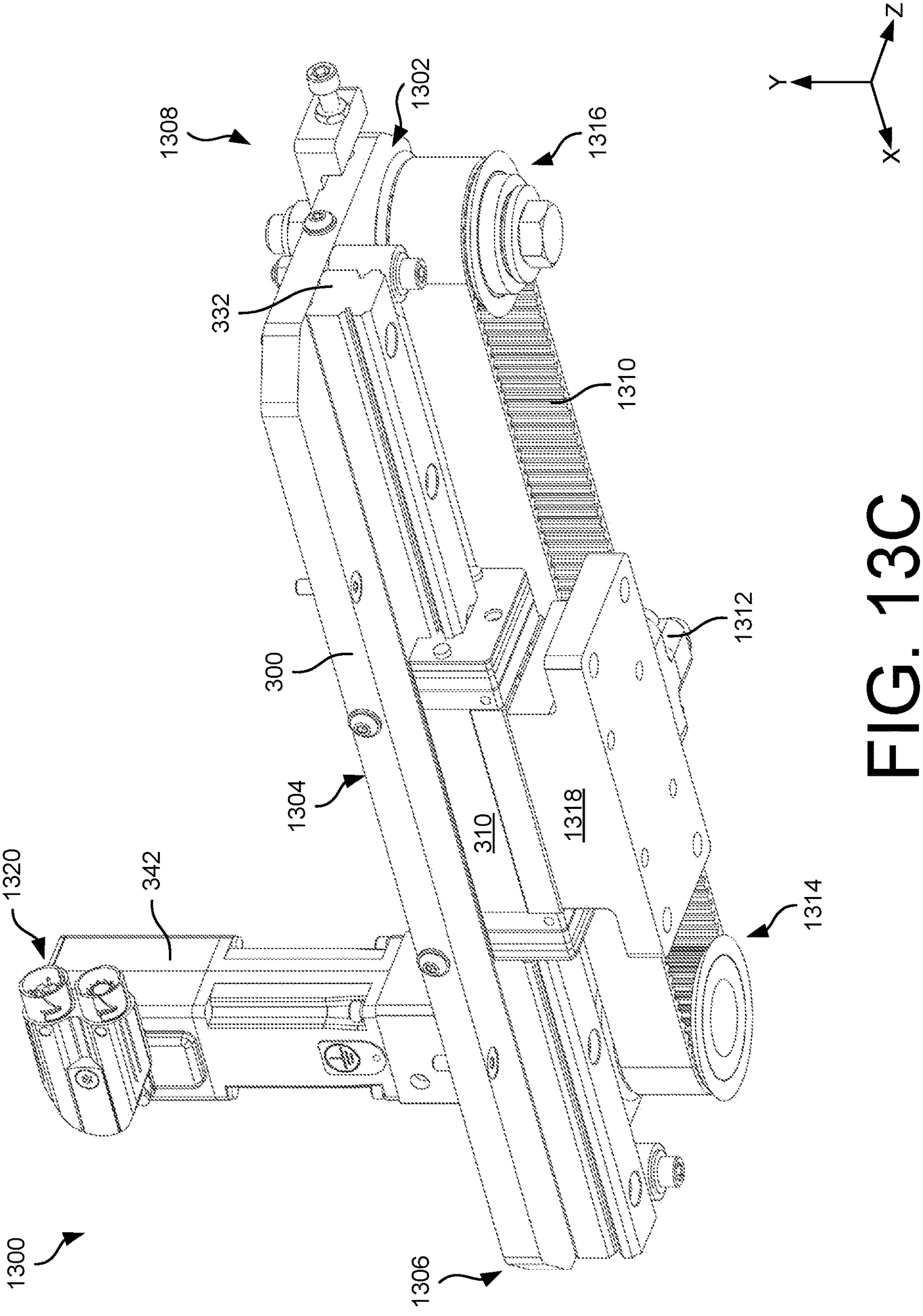

FIGS. 13A-13C illustrate a positioning system 1300 coupled to the end effector 200, according to examples of the present disclosure. FIG. 13A illustrates a bottom view of the positioning system 1300, FIG. 13B illustrates a first perspective side view of the positioning system 1300, and FIG. 13C illustrates a second perspective side view of the positioning system 1300. In some instances, the positioning system 1300 represents a component of the end effector 200, or may represent a separate component coupled to the end effector 200.

In some instances, the positioning system 1300 may be configured to maneuver or position the end effector 200 above, or relative to, the edible crown 118. For example, the robotic arm 120 may position the end effector 200 in one or more directions and/or rotate the end effector 200 about one or more axes. The positioning system 1300, meanwhile, may position the end effector 200 in one or more directions and/or rotate the end effector 200 about one or more axes that are different than the robotic arm 120. Additionally, or alternatively, the robotic arm 120 may perform coarse movements, while the positioning system 1300 may perform more granular movements. In some instances, the positioning system 1300 may be limited to an amount of movement, such as translationally moving the housing 302 in one direction (e.g., along the Z-axis), while the robotic arm 120 may move the housing 302 in more degrees of freedom.

In some instances, the positioning system 1300 may be configured to translate to account for the movement of the machine 100. For example, as the end effector 200 grasps the edible crown 118, the machine 100 may still be moving in the direction of travel. To prevent the end effector 200 pulling (e.g., tugging) on the edible crown 118 and/or the stalk 116, the positioning system 1300 and/or the robotic arm 120 may move in an opposite direction. This opposite direction may be opposite to the direction of travel of the machine 100 to keep the end effector 200 centered over the edible crown 118 during harvest.

As shown, the rail 332 may couple to an underneath side 1302 of the mount 300. The robotic arm 120 may couple to an upper side 1304 of the mount 300, opposite the underneath side 1302 (e.g., spaced apart in the Y-direction). The carriage 310 may translate along the rail 332, between a first end 1306 and a second end 1308. For example, the rail 332 may include grooves or channels engaged by the carriage 310. The engagement between carriage 310 and the rail 332 may maintain an alignment of the carriage 310 as the carriage 310 moves between the first end 1306 and the second end 1308.

The carriage 310 couples to a belt 1310 via a clamp 1312. For example, the clamp 1312 may couple the carriage 310 to the belt 1310. Additionally, or alternatively, the clamp 1312 may couple to a bracket 1318 coupled to the top 308 of the housing 302. The bracket 1318 may also couple to the carriage 310. The belt 1310, as shown, is wrapped around a first sprocket 1314 and a second sprocket 1316. The first sprocket 1314 may be operably coupled to the second actuator 342 such that as the second actuator 342 rotates, for example, the belt 1310 may corresponding move. This movement is imparted to the housing 302 via the coupling of the clamp 1312 to the belt 1310, and via the coupling of the clamp 1312 to the carriage 310 and/or the bracket 1318.

The first actuator 326, the second actuator 342, and the third actuator 402 may receive power, pressurized air, pressurized fluid, signals, and so forth via various couplings. Additionally, the first actuator 326, the second actuator 342, and the third actuator 402 may be configured to provide various signals to the machine 100, or other remotely coupled device. For example, the second actuator 342 may include fittings 1320 for receiving power and/or signals that actuate the second actuator 342, and correspondingly, causes movement of the carriage 310 along the rail 332.

Figure 14:
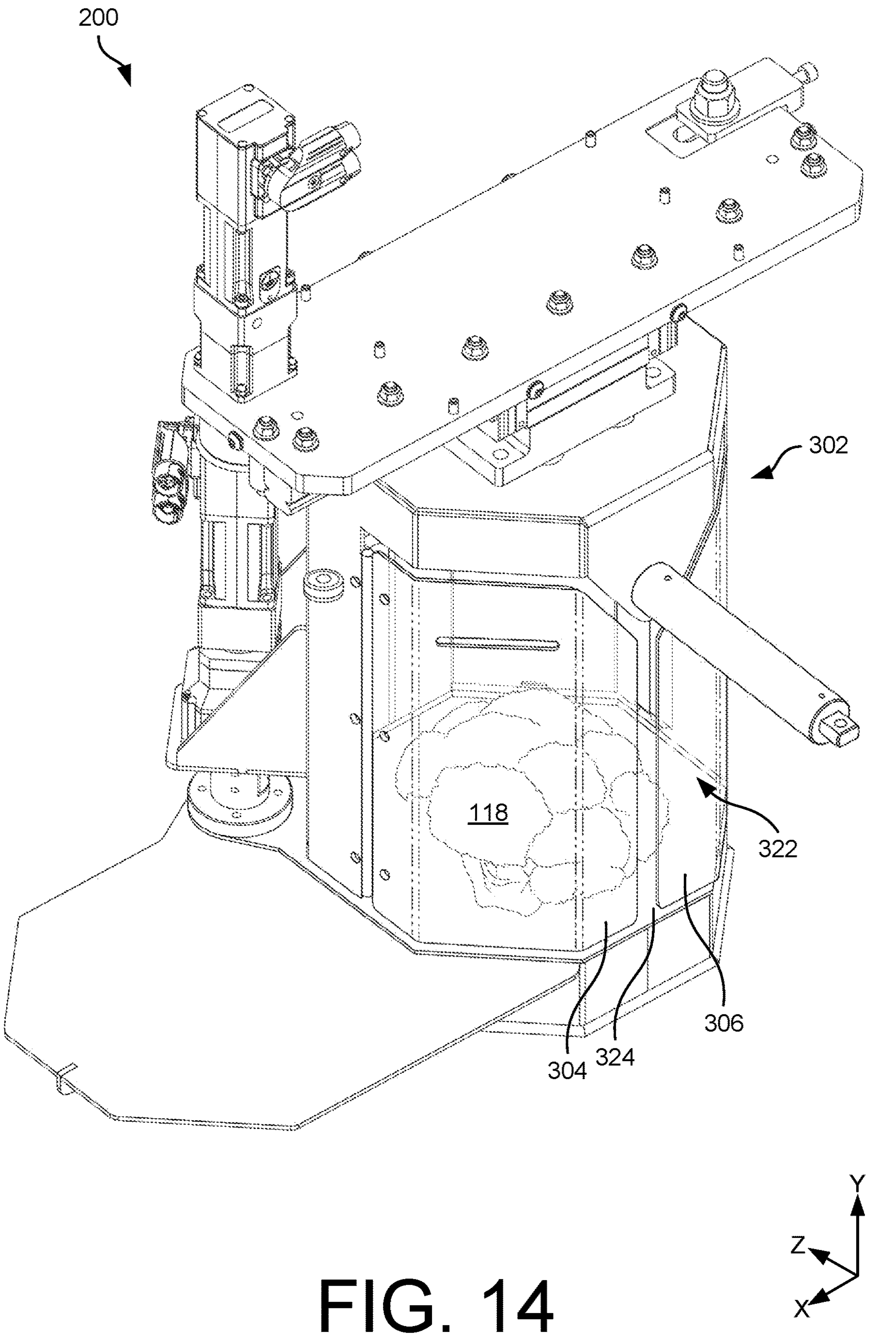
FIG. 14 illustrates an example edible portion of a plant being disposed within the end effector of FIG. 3, according to examples of the present disclosure.

FIG. 14 illustrates the end effector 200 in the closed state, showing the edible crown 118 of the broccoli plant 104 being disposed within the receptacle 322, according to examples of the present disclosure. As shown, the first door 304 and the second door 306 are in the closed state, and the cutting mechanism 324 is disposed within the housing 302 (e.g., in the extended position). The edible crown 118 may be connected to a portion of the stalk 116 that was severed from a portion of the stalk 116 that remains in the field 102. This portion of the stalk 116 may rest on the top surface 1000 of the cutting mechanism 324. As the end effector 200 moves to the conveyor 124, the first door 304 and/or the second door 306 may open, and/or the cutting mechanism 324 may move to the retracted position, such that the edible crown 118 is removed from the receptacle 322.

FIGS. 15A-15E illustrates a sequence of operations for harvesting the edible crowns 118, according to examples of the present disclosure.

Figure 15A:
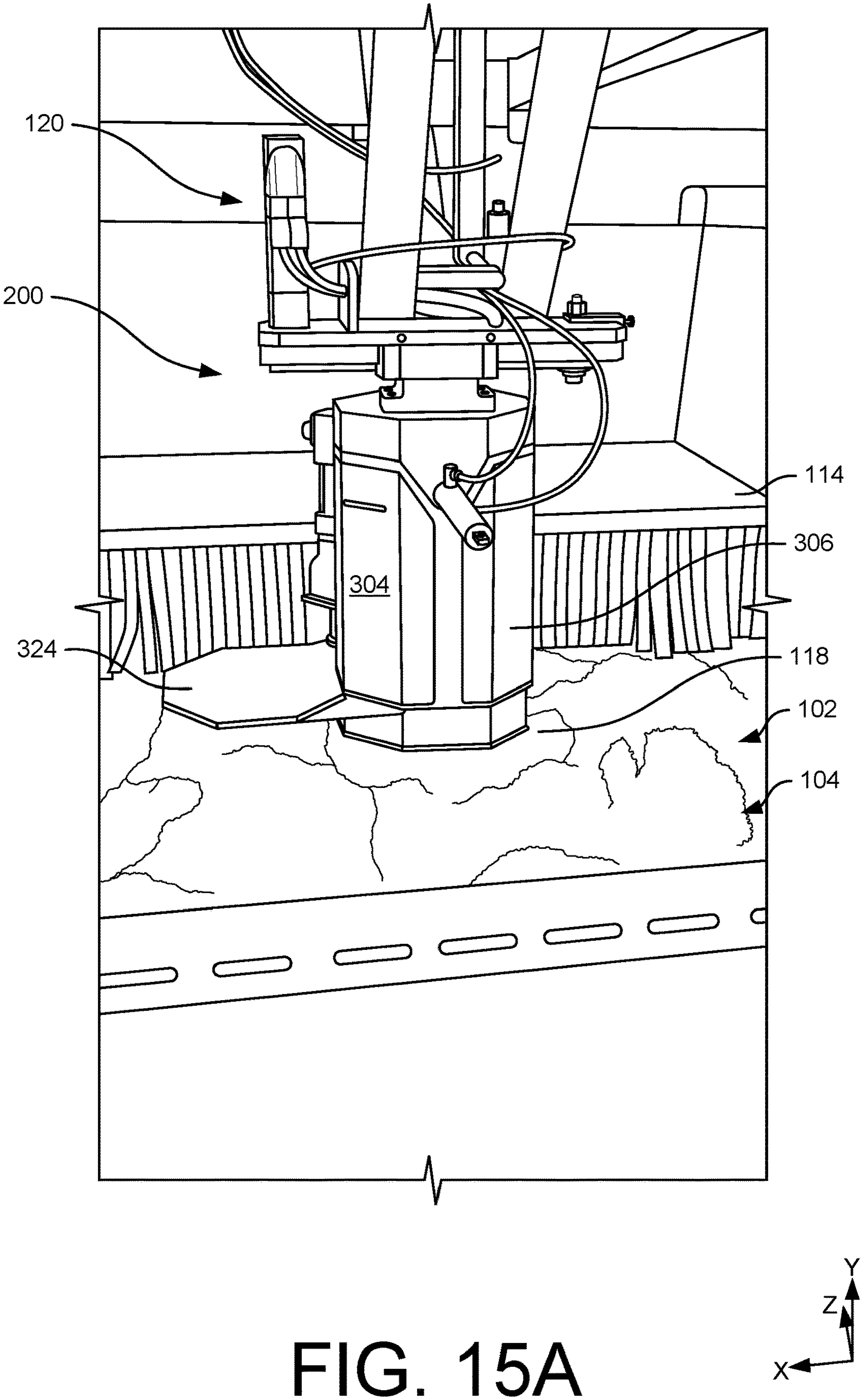
FIGS. 15A-15E illustrate an example sequence for harvesting an edible portion of a plant with the end effector of FIG. 3, according to examples of the present disclosure.

In FIG. 15A, the end effector 200 is shown disposed vertically above the broccoli plants 104 within the field 102. For example, an imaging system may be disposed on/within, or beneath the hood 114 for imaging the broccoli plants 104. These image(s), as discussed above, are analyzed to determine whether the edible crowns 118 are ready for harvesting. In response to determining that the edible crowns 118 are ready for harvesting, the robotic arm 120 may move the end effector 200. As shown in FIG. 15A, the first door 304 and the second door 306 are in the closed state, and the cutting mechanism 324 is in the retracted position. As such, when the edible crowns 118 are ready for harvesting, the end effector 200 may descend upon the edible crowns 118.

Figure 15B:
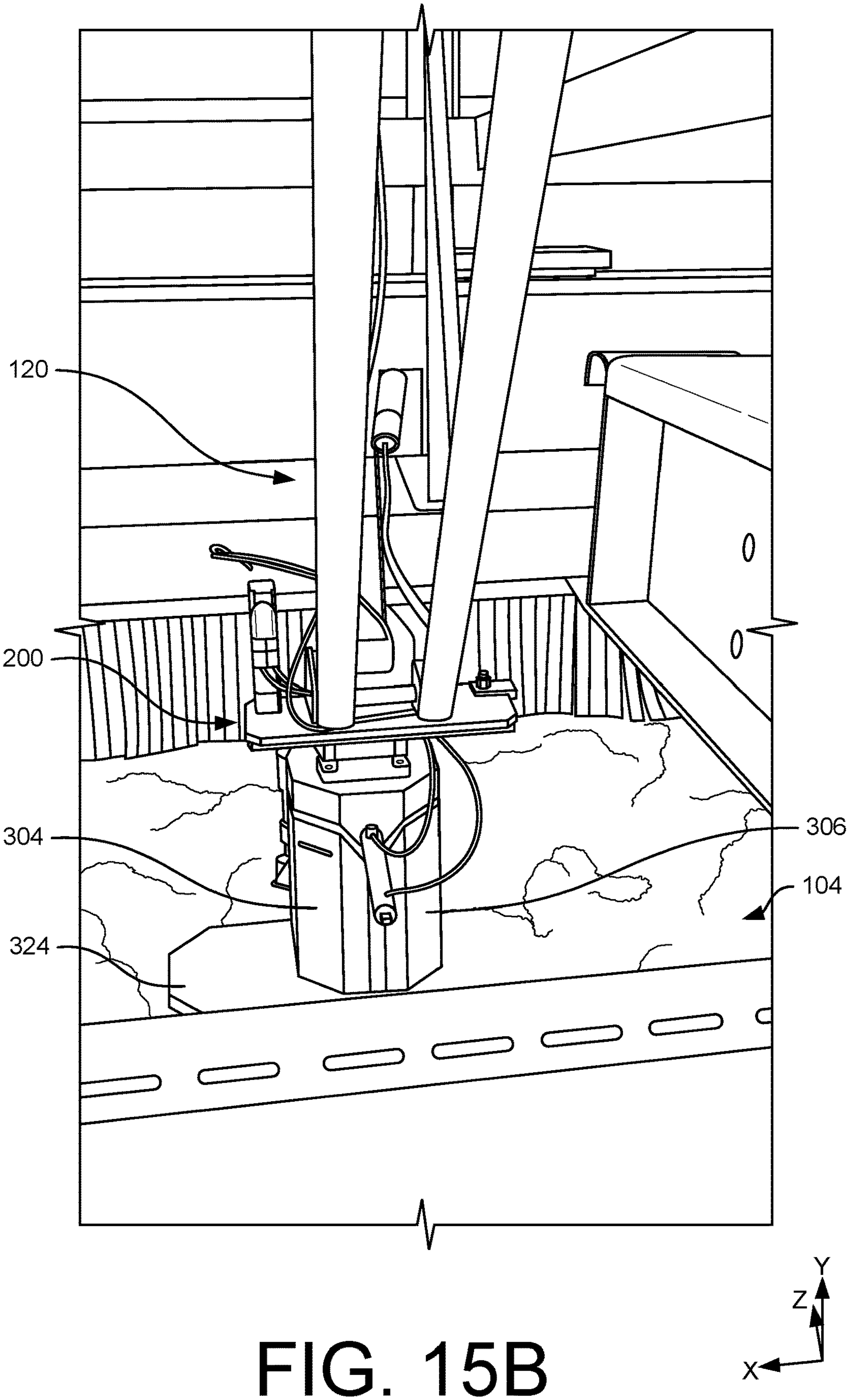

In FIG. 15B, the end effector 200 is shown descending upon the edible crown 118. For example, the robotic arm 120 may extend to move the end effector 200 into a position over the edible crown 118. The robotic arm 120 may be moved to a position for harvesting the edible crown 118 based on a location of the edible crown 118 as determined from the image(s) obtained by the positioning system 1300. When the end effector 200 descends upon the edible crown 118, the first door 304 and the second door 306 are in the closed state, and the cutting mechanism 324 is in the retracted position.

Figure 15C:
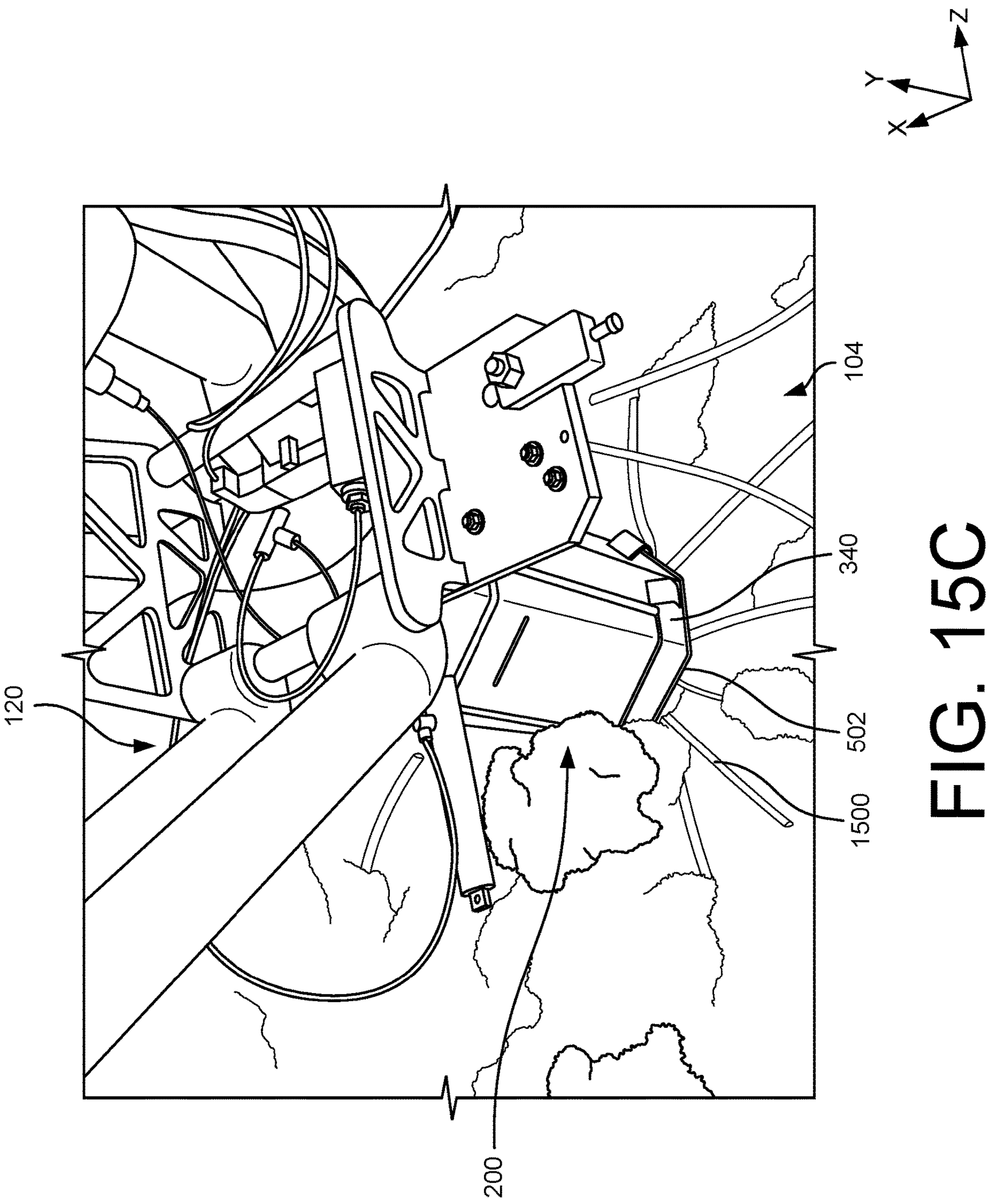

In FIG. 15C, the end effector 200 is shown descending upon the edible crown 118. FIG. 15B and FIG. 15C both illustrate the end effector 200 descending upon the edible crown 118, however, in FIG. 15C, leaves or other foliage 1500 of the broccoli plants 104 is shown being stripped away. For example, as the housing 302 descends upon the edible crown 118, in a direction towards a ground surface, the leading edge 502 of the bottom portion 340 may engage with branches, stems, leaves, and/or foliage 1500 extending from the stalk 116. As the housing 302 is advanced further downward towards the ground surface, the foliage 1500 may become stripped away. For example, the foliage 1500 may snap away from the stalk 116. Removing the foliage 1500 at this instance may increase throughput to harvest the edible crowns 118. For example, personnel onboard the machine 100, or elsewhere, may spend less time separating or removing the foliage 1500 from the edible crown 118.

Figure 15D:
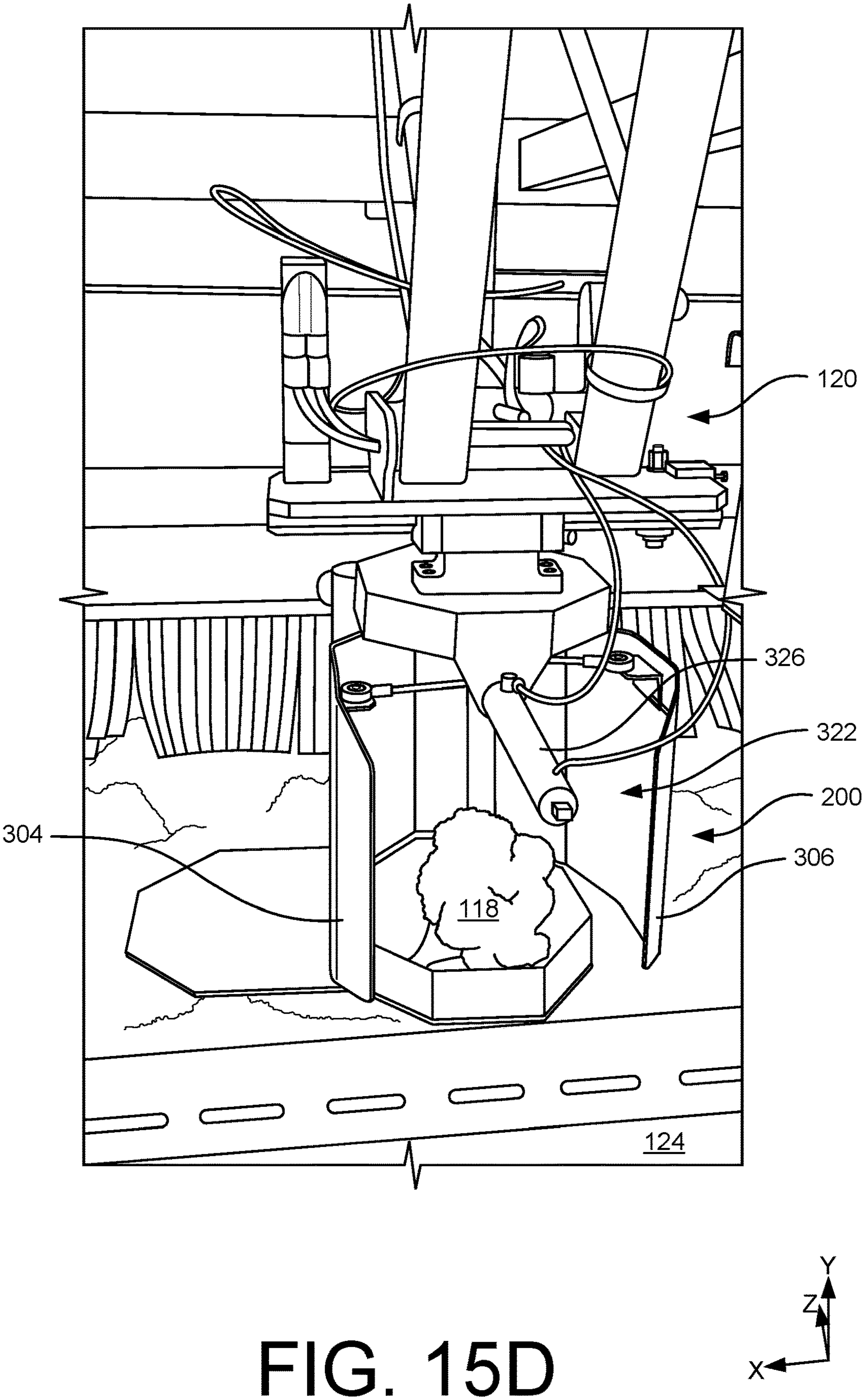

In FIG. 15D, the end effector 200 is shown moving in a direction towards the conveyor 124. As the end effector 200 moves towards the conveyor 124, the first door 304 and the second door 306 may transition to the opened state. For example, the first actuator 326 may actuate to cause the first door 304 and the second door 306 to open. Additionally, the cutting mechanism 324 may remain in the retracted position such that the edible crown 118 that resides within the receptacle 322 does not fall out of the end effector 200. In some instances, the first door 304 and the second door 306 may be opened prior to the end effector 200 reaching, or being disposed above, the conveyor 124. For example, as the first door 304 and the second door 306 are opened, the momentum of the robotic arm 120 may cause the edible crown 118 to be flung, tossed, or otherwise ejected from the end effector 200. That is, given that the robotic arm 120 may move the end effector 200 towards the conveyor 124, this motion is imparted to the edible crown 118. In some instances, the end effector 200 may not reach, or be disposed over the conveyor 124, before the edible crown 118 is ejected from the end effector 200. In some instances, the edible crown 118 may be flung from the end effector 200 as the end effector 200 reserves direction (e.g., away from the conveyor 124).

Figure 15E:
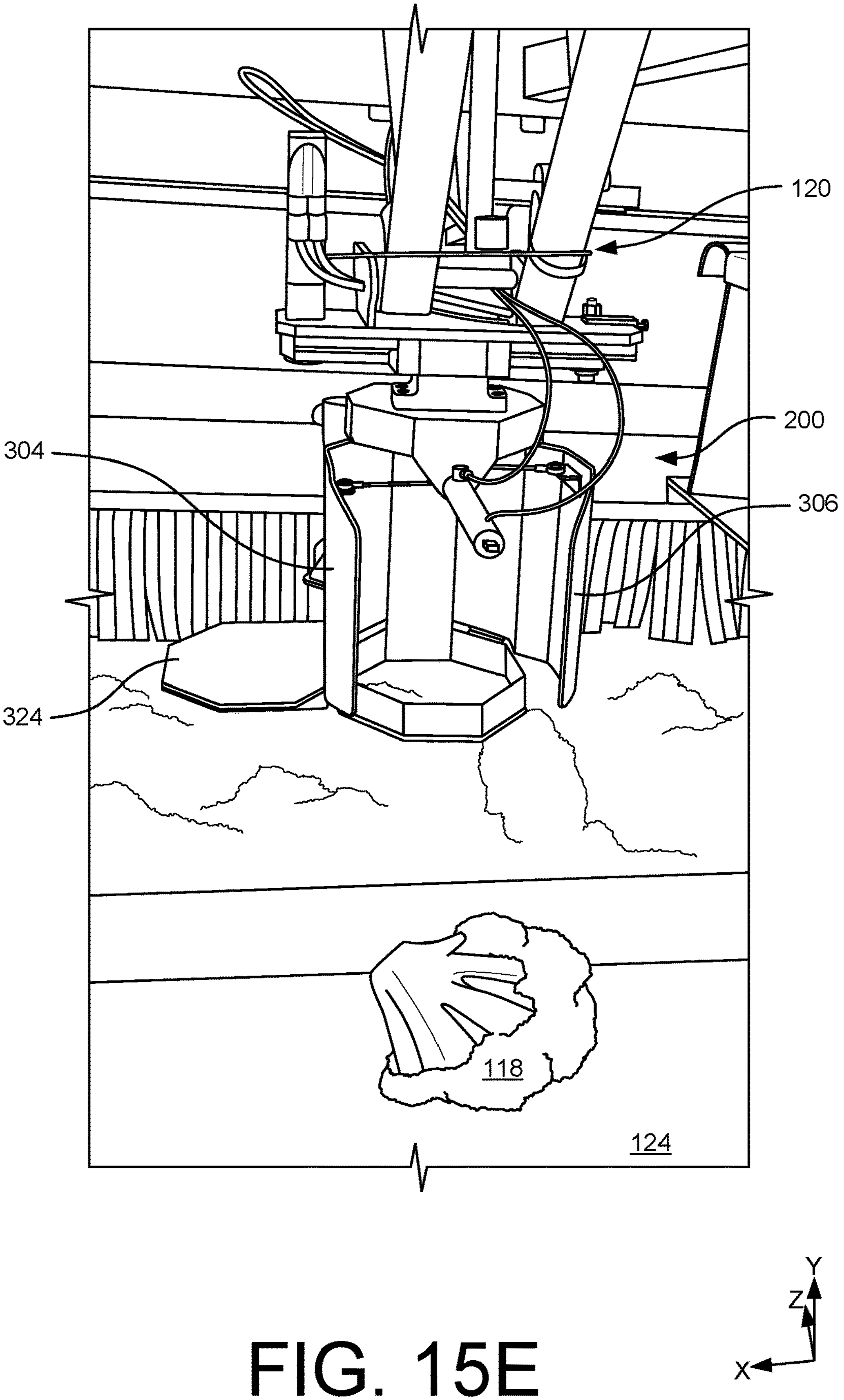

In FIG. 15E, the edible crown 118 is shown being deposited on the conveyor 124. Additionally, the first door 304 and the second door 306 are shown in the opened position to permit the edible crown 118 to be ejected from the end effector 200. The cutting mechanism 324 is also shown in the retracted position following the edible crown 118 being removed. The first door 304 and the second door 306 may be closed to permit the end effector 200 to descend upon additional edible crowns 118 for harvesting. The conveyor 124 may also include other edible crowns 118 harvested from other end effectors 200.

Figure 16:
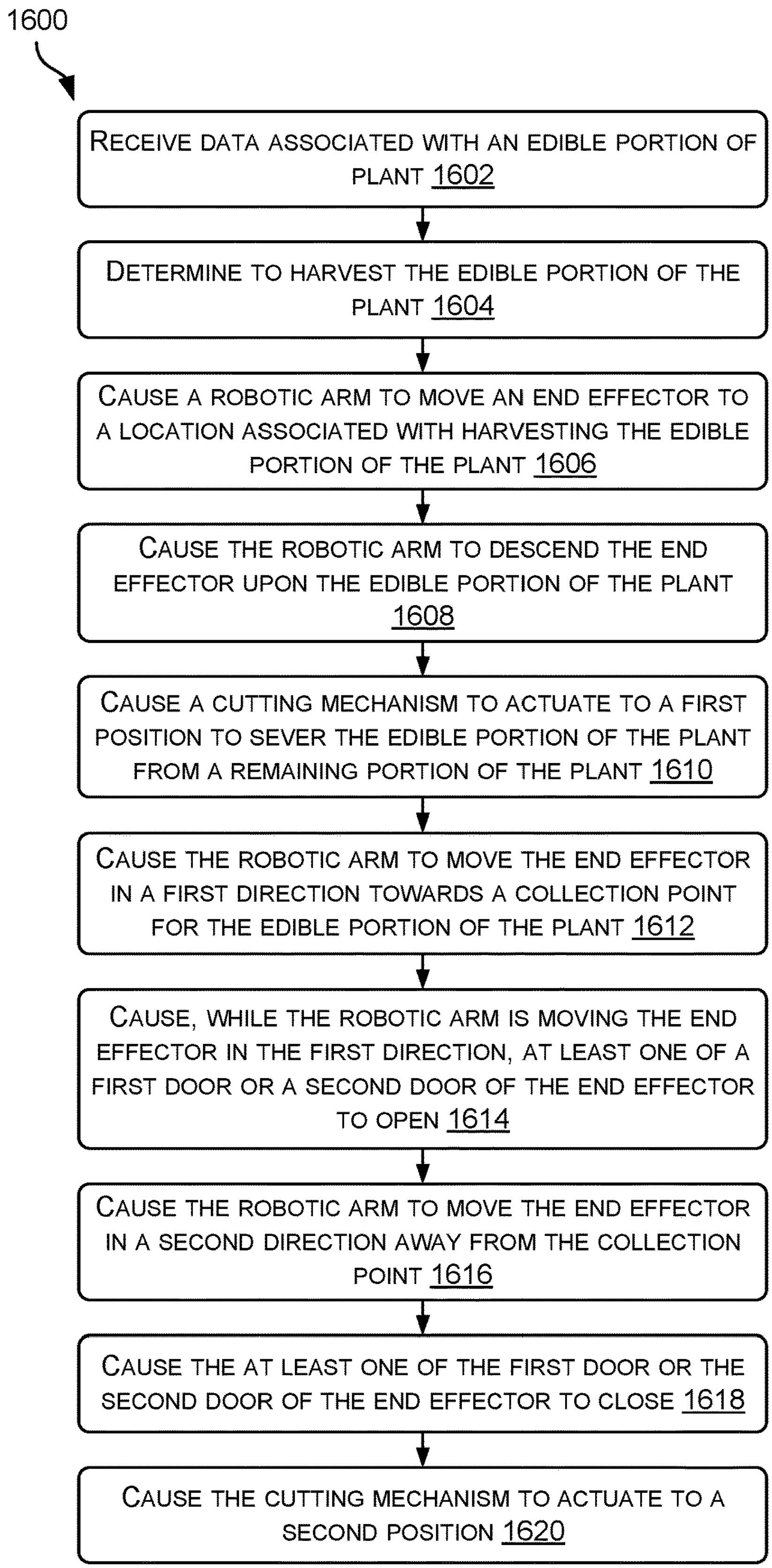
FIG. 16 illustrates an example process for harvesting edible portions of plants, according to examples of the present disclosure.

FIG. 16 illustrates an example process 1600 for harvesting edible crowns 118, according to examples of the present disclosure. The process 1600 described herein is illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the process 1600 is described with reference to the environments, devices, architectures, diagrams, and systems described in the examples herein, such as, for example those described with respect to FIGS. 1-15E, although the process 1600 may be implemented in a wide variety of other environments, architectures, and systems.

At 1602, the process 1600 may include receiving data associated with an edible portion of a plant. For example, an imaging system of the machine 100 may capture image data (or other sensor data) that represents the edible portion of the plant. In some instances, the data is received while the machine 100 is moving about the field 102.

At 1604, the process 1600 may include determining to harvest the edible portion of the plant. For example, based at least in part on the data received at 1602, the process 1600 may determine that the edible portion of the plant is ready for harvesting. In some instances, determining that the edible portion of the plant is ready for harvesting may be based at least in part on determining one or more characteristics of the edible portion (e.g., size, color, shape, size, etc.) and comparing these characteristics with one or more reference characteristics (e.g., size, color, shape, size, etc.). This comparison may indicate whether the edible portion of the plant is ready for harvesting.

At 1606, the process 1600 may include causing a robotic arm to move an end effector to a location associated with harvesting the edible portion of the plant. For example, based at least in part on determining that the edible portion of the plant is ready for harvesting, the robotic arm 120 may move the end effector 200. In some instances, moving the end effector 200 may include moving the end effector 200 to a location located vertically above the edible portion of the plant (or more generally, above the plant). In some instances, the location of the edible portion of the plant may be determined via the data at 1602.

At 1608, the process 1600 may include causing the robotic arm to descend the end effector upon the edible portion of the plant. For example, once positioned above the edible portion of the plant, the robotic arm 120 may descend the end effector 200 upon (e.g., over) the edible portion of the plant. When the robotic arm 120 descends the end effector 200 upon the edible portion of the plant, the cutting mechanism 324 may be in the retracted position, and the first door 304 and/or the second door 306 may be in closed state. As such, the bottom of the end effector 200 (or the housing 302) may be open to receive the edible portion of the plant within the receptacle 322.

At 1610, the process 1600 may include causing a cutting mechanism to actuate to a first position to sever the edible portion of the plant from a remaining portion of the plant. For example, once the end effector 200 has descended upon the edible portion of the plant, and once the edible portion of the plant is within the receptacle 322, the cutting mechanism 324 may be actuated via the second actuator 342. Actuation of the cutting mechanism 324 severs the edible portion of the plant from a remaining portion of the plant that is not harvested (e.g., the stalk 116). Following a severing of the edible portion of the plant from a remaining portion of the plant, the cutting mechanism 324 remains in this position such that the edible portion of the plant is retained within the receptacle 322.

At 1612, the process 1600 may include causing the robotic arm to move the end effector in a first direction towards a collection point for the edible portion of the plant. For example, once the edible portion of the plant is severed from the remaining portion of the plant, the robotic arm 120 may move in a first direction towards the conveyor 124.

At 1614, the process 1600 may include causing, while the robotic arm is moving the end effector in the first direction, at least one of a first door and a second door of the end effector to open. For example, as the robotic arm 120 moves the end effector 200 to the conveyor 124, the first actuator 326 may actuate to open at least one of the first door 304 or the second door 306. That is, the first door 304 and/or the second door 306 may transition from the closed state to the opened state. In some instances, as the first door 304 and/or the second door 306 are opened, the momentum of the robotic arm 120 may cause the edible portion of the plant to be flung, tossed, or otherwise removed from the end effector 200. That is, given that the robotic arm 120 may move the end effector 200 towards the conveyor 124, opening the first door 304 and/or the second door 306 may cause the edible portion of the plant to be ejected from the end effector 200.

At 1616, the process 1600 may include causing the robotic arm 120 to move the end effector in a second direction away from the collection point. For example, at 1614, the edible portion of the plant may be removed from the end effector 200, and at 1616, the robotic arm 120 may move the end effector in the second direction back towards the field to harvest another edible portion of another plant. In some instances, the edible portion of the plant harvested at 1604-1608 may be ejected from the end effector 200 as the end effector 200 reserves direction back to the field 102 (e.g., from the first direction to the second direction).

At 1618, the process 1600 may include causing at least one of the first door or the second door of the end effector to close. For example, as the robotic arm 120 moves the end effector 200 back towards the field 102, or once the edible portion of the plant is removed from the end effector 200, the first actuator 326 may actuate to cause the first door 304 and/or the second door 306 to transition to the closed state. Transitioning to the closed state encloses the receptacle 322 of the end effector 200 such that another edible portion of another plant may be retained within the end effector 200 during a subsequent harvest.

At 1620, the process 1600 may include causing the cutting mechanism to actuate to a second position. For example, the third actuator 402 may move the cutting mechanism from the extended position to the retracted position. At the retracted position, a bottom of the receptacle 322 is open such that the end effector 200 may descend upon a subsequent edible portion. In some instances, the third actuator may actuate the cutting mechanism to the second position in parallel or simultaneous with the first actuator 326 actuating the first door 304 and/or the second door 306 to the closed state.

While various examples and embodiments are described individually herein, the examples and embodiments may be combined, rearranged, and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A machine for harvesting an edible portion of a plant, the machine comprising:

an end effector including:

a housing having:

an upper portion with a top and a bottom, a lower portion coupled to the bottom of the upper portion, a first door hingedly coupled to the upper portion, at a location between the top and the bottom, and configured to rotate about a first axis extending in a direction between the top and the bottom of the upper portion, the first door being configured to selectively permit or restrict access to an interior of the housing, and a second door hingedly coupled to the upper portion, at a location between the top and the bottom, and configured to rotate about a second axis extending in a direction between the top and the bottom of the upper portion, the second door configured to selectively permit or restrict access to the interior of the housing, a cutting mechanism including a blade, a first actuator coupled to the first door and the second door, the first actuator being configured to transition the first door and the second door between an open state and a closed state, and a second actuator coupled to the cutting mechanism, the second actuator being configured to transition the blade between a first position in which the blade is disposed external to the housing and a second position in which the blade is disposed at least partially internal to the housing; and a robotic arm coupled to the end effector, the robotic arm providing the end effector with at least three degrees of movement.

2. The machine of claim 1, wherein in the second position, the cutting mechanism is disposed at least partially between the upper portion of the housing and the lower portion of the housing.

3. The machine of claim 1, further comprising:

a rail;

a slide operably coupled to the rail and the first actuator;

a first linkage including:

a first end coupled to the first door, and a second end coupled to the slide; and a second linkage including:

a third end coupled to the second door, and a fourth end coupled to the slide.

4. The machine of claim 1, further comprising:

a rail;

a carriage operably coupled to the rail, the carriage being coupled to the housing;

a belt;

a clamp configured to couple the belt to the carriage; and a third actuator configured to actuate the belt and translate the carriage along the rail.

5. The machine of claim 1, wherein the second actuator is configured to rotate the cutting mechanism between the first position and the second position.

6. The machine of claim 1, wherein:

the upper portion has an enclosed top;

the lower portion has an open bottom;

the housing includes a sidewall;

the first door is hingedly coupled to a first side of the sidewall;

the second door is hingedly coupled to a second side of the sidewall; and the interior is defined by the upper portion, the enclosed top, the sidewall, the first door, and the second door.

7. An end effector, comprising:

a housing including:

a top portion, and a bottom portion including a first end and a second end;

a first door pivotably coupled to the top portion of the housing, the first door including a first end and a second end opposite the first end;

a second door pivotably coupled to the top portion of the housing, the second end including a first end and a second end opposite the first end;

an actuator operably coupled proximate to the first end of the first door and proximate to the first end of the second door, the actuator being configured to transition the first door and the second door between (i) a closed state in which access to an interior of the housing is restricted and (ii) an opened state in which access to the interior of the housing is permitted; and a cutting mechanism including a blade configured to sever an edible portion of a plant from a remaining portion of the plant, the blade being disposable at least partially within a gap distance defined between (i) the second end of the first door and the first end of the bottom portion and (ii) the second end of the second door and the first end of the bottom portion.

8. The end effector of claim 7, further comprising a second actuator coupled to the blade.

9. The end effector of claim 8, wherein:

the second actuator is configured to transition the blade between a first position and a second position;

in the first position, the blade provides access to the interior of the housing; and in the second position, the blade restricts access to the interior of the housing.

10. The end effector of claim 9, wherein in the second position, at least part of the edible portion is retained on a surface of the blade.

11. The end effector of claim 7, further comprising:

a rail disposed within the housing;

a sled operably coupled to the rail;

a first linkage coupled to the sled and the first door; and a second linkage coupled to the sled and the second door, wherein:

actuation of the actuator in a first direction causes the sled to move in the first direction to transition the first door and the second door from the opened state to the closed state, and actuation of the actuator in a second direction that is opposite the first direction causes the sled to move in the second direction to transition the first door and the second door from the closed state to the opened state.

12. The end effector of claim 7, further comprising a shelf extending from the bottom portion, wherein the shelf is configured to receive at least a portion of the cutting mechanism.

13. The end effector of claim 7, wherein the second end of the bottom portion descends upon the plant.

14. An end effector, comprising:

a housing;

a door;

a rail;

a slide disposable along the rail;

a linkage coupled to the door and the slide;

a first actuator coupled to the slide, the first actuator being configured to displace the slide along the rail to transition the door between a closed state and an opened state via an engagement between the linkage and the slide;

a cutting mechanism including a blade;

a second actuator coupled to the cutting mechanism, the second actuator being configured to transition the blade between an extended position and a retracted position; and a receptacle configured to receive an edible portion of a plant, wherein:

in the closed state of the door and the extended position of the blade, access to the receptacle is restricted, and in the opened state of the door or the retracted position of the blade, access to the receptacle is permitted.

15. The end effector of claim 14, wherein in the closed state of the door and the extended position of the cutting mechanism, the receptacle is defined at least in part by the housing, the door, and the cutting mechanism.

16. The end effector of claim 14, wherein in the closed state of the door and the retracted position of the cutting mechanism, the receptacle is configured to receive the edible portion of the plant.

17. The end effector of claim 14, wherein:

the housing includes a top portion and a bottom portion;

the door operably couples to the top portion;

the second actuator is configured to rotate the cutting mechanism into the extended position to sever the edible portion of the plant from a remaining portion of the plant; and in the extended position, the cutting mechanism is disposed at least partially between the top portion and the bottom portion.

18. The end effector of claim 14, further comprising:

a second rail;

a carriage operably coupled to the second rail, the carriage being coupled to the housing;

a belt;

a clamp configured to couple the belt to the carriage; and a third actuator configured to actuate the belt and translate the carriage along the second rail.

19. The end effector of claim 14, further comprising a second door operably coupled to the housing, wherein:

the first actuator couples to the second door, the first actuator is configured to transition the second door between the closed state and the opened state simultaneously with the door;

in the closed state of the second door and the extended position of the cutting mechanism, access to the receptacle is restricted; and in the opened state of the second door or the retracted position of the cutting mechanism, access to the receptacle is permitted.

20. The end effector of claim 14, wherein:

the housing includes a top and a bottom opposite the top;

the top is configured to couple to a robotic arm; and the bottom is configured to descend upon the edible portion of the plant, and strip away foliage disposed beneath the edible portion of the plant.

* * * * *